United States Patent [19]

Tada et al.

[11] Patent Number: 5,887,171

[45] Date of Patent: Mar. 23, 1999

[54] DOCUMENT MANAGEMENT SYSTEM INTEGRATING AN ENVIRONMENT FOR EXECUTING AN AGENT AND HAVING MEANS FOR CHANGING AN AGENT INTO AN OBJECT

[75] Inventors: Katsumi Tada, Yokohama; Kazuhiro Hashimoto, Otsu; Shigeru Kameda, Takarazuka; Noriyuki Yamasaki; Yoshiki Matsuda, both of Yokohama; Tetsuya Hashimoto, Tokyo; Akio Azuma, Kashiwa, all of Japan

[73] Assignee: Hitachi, Ltd., Tokyo, Japan

[21] Appl. No.: 789,562

[22] Filed: Jan. 28, 1997

[30] Foreign Application Priority Data

Jan. 29, 1996 [JP] Japan .................................. 8-012533

[51] Int. Cl.[6] .................................................. G06F 15/173
[52] U.S. Cl. ........................ 395/683; 395/200.36; 707/4;
707/10; 707/103; 707/500
[58] Field of Search .............................. 395/683, 200.36;
707/103, 4, 10, 500

[56] References Cited

U.S. PATENT DOCUMENTS

| | | | |
|---|---|---|---|
| 5,181,162 | 1/1993 | Smith et al. ............................. | 707/530 |
| 5,367,635 | 11/1994 | Bauer et al. ........................ | 395/200.51 |
| 5,414,812 | 5/1995 | Filip et al. .............................. | 707/103 |
| 5,551,035 | 8/1996 | Arnold et al. ........................... | 395/683 |
| 5,588,147 | 12/1996 | Neeman et al. ......................... | 711/100 |
| 5,613,100 | 3/1997 | Anezaki .................................. | 395/500 |
| 5,659,701 | 8/1997 | Amit et al. .............................. | 395/684 |
| 5,717,922 | 2/1998 | Hohensee et al. ...................... | 707/102 |

OTHER PUBLICATIONS

"Object–oriented Analysis and Design", Journal of Information Processing Society of Japan, vol. 35, No. 5, 1994, S. Honiden et al, pp. 392–401.

"Latest Object–oriented Practice Guide", Nikkei BP Ltd., 1995, Anonymous, pp. 9–17, 170–177.

"Agent–Oriented Computing", T. Kinoshita et al, Software Research Center, 1995, pp. 11–27.

"KQML as an Agent Communication Language", The Proceedings of the Third International Conference on Information and Knowledge Management, ACM Press, Tim Finin et al, Nov. 1994, pp. 1–8.

Muralidharan, B., "Multiprotocol Management Agents: A Look at an Implementation and the Issues to consider", IEEE, pp. 1336–1345, 1993.

Proceedings of the 3rd International Conference on Information and Knowledge Management, 28 Nov.—2 Dec, 1994, "KQML As An Agent Communication Language", T. Finin et al, pp. 456–463.

Intelligent Agents—ECAI–94 Workshop on Agent Theories, Architures, and Languages, Aug. 1994, "Design of a Concurrent Agent–Oriented Language", D. Weerasooriya et al, pp. 3386–3389.

Proceedings of the 29ty Hawaii International Conference on System Sciences, vol. 1, Jan. 1996, "Homage: A Heterogeneous Object–Based Environment to Develop Multi–Agent Systems", A. Poggi, pp. 282–289.

*Primary Examiner*—Thomas G. Black
*Assistant Examiner*—Jean R. Homere
*Attorney, Agent, or Firm*—Fay, Sharpe, Beall, Fagan, Minnich & McKee

[57] ABSTRACT

A document management system a high extendability, flexibility, and stability capable of solving a problem that, as an agent-oriented paradigm system extends, the number of agents increases and indefinite factors increase. In the system configuration with an object execution environment implemented with an object-oriented function and an agent execution environment implemented with an agent-oriented function, a unit for changing an agent into an object is provided for using the agent execution environment as the object execution environment. With this configuration, a system developer can use the merits of both the object- and agent-oriented paradigms by implementing a function necessary for stable operation by an object and a function with high change occurrence frequency by an agent.

36 Claims, 29 Drawing Sheets

DOCUMENT MANAGEMENT SYSTEM INTEGRATING AN ENVIRONMENT FOR EXECUTING AN AGENT AND HAVING MEANS FOR CHANGING AN AGENT INTO AN OBJECT

BACKGROUND OF THE INVENTION

The present invention relates to a document management system, and more particularly to a document management system having a configuration integrating both an environment for executing an object and an environment for executing an agent, and means for changing an agent into a object. The means for changing an agent into an object is applicable not only to document management systems but also to general computer systems.

As recent document management systems become large and highly sophisticated, the functions of the document management systems are frequently extended. These systems require highly extendable and flexible architectures in order to facilitate function extensions and modifications. Once a document management system is incorporated, it is used for a long period while its functions are being extended. Therefore, such a system requires an architecture of high stability and easy maintenance.

First conventional techniques for such a system configuration are an object-oriented approach: "Object-Oriented Analysis and Design" by Shinich HONIDEN and Akihiro YAMASHIRO, Journal of Information Processing Society of Japan, Vol. 35, No. 5, 1994 (hereinafter called Prior Art 1). According to the object-oriented approach described in this paper, a subject in real world (called an object) and an interconnection between subjects (called a relationship) are taken into consideration, each object is assigned a task, and each object requests an another object to execute a particular task. Introduction of this object-oriented paradigm, simulating approximately to modelling and encapsulating of real subject world, makes the change range of a system be localized, and each process is executed like a component by an object. Therefore, productivity of adding a function can be improved.

Attention has recently been drawn to a distributed object-oriented approach in which a plurality of hardware components and objects on OSes connected by a network can be cooperated: "Latest Object-Oriented Practice Guide" by Nikkei BP Ltd., 1995 (hereinafter called Prior Art 2).

Second conventional techniques are an agent-oriented approach: "Agent-Oriented Computing" by Tetsuo KINOSHITA and Kenji SUGAHARA, Soft Research Center, 1995 (hereinafter called Prior Art 3). An agent is defined as a processor which recognizes a status in accordance with an interaction with external environments or proceeds autonomous problem solution toward a target in cooperation with another agent. A system comprises intelligent and self-complete agents as main system elements. Each agent dynamically and flexibly interacts with another agent by using common language, i.e., agent communication language. Operation of an agent itself and cooperation with another agent provide system functions.

Object-oriented technologies have been recently used for providing particular means for efficiently developing highly sophisticated software. An agent-oriented system using such an object-oriented architecture as its basic technologies has been developed: "KQML as an Agent Communication Language", by Tim Finin, Richard Fritzson, Don McKay, and Robin McEntire, The proceedings of the Third International Conference on Information and Knowledge Management, ACM Press, November 1994 (hereinafter called Prior Art 4). An agent-oriented architecture is configured on an object-oriented architecture. An agent can be considered as an object having functions extended by the agent-oriented approach. The functions extended by the agent-oriented approach include two functions: a cooperation mechanism through intermediation and a mobile agent. These two functions will be described in the following.

FIG. 2 is a diagram illustrating communications between agents using the cooperation mechanism through intermediation described, for example, in Prior Art 4. In FIG. 2, reference numerals 101 and 103 represent an agent, and reference numeral 102 represents a cooperation promoter (or facilitator) having a support function of cooperation between agents. In this configuration, first the agent 103 notifies (110) the cooperation promotor 102 of functions the agent 103 can provide. The succeeding operation of issuing a processing request from the agent 101 and executing the process in cooperation with another agent (agent 103) will be described. It is assumed here that the agent 101 has no knowledge of the agent 103 to which a processing request message is transmitted. If the agent has knowledge of the other agent to which a processing request message is transmitted, the agent directly communicates with the other agent. If not as in this example, the agent transmits a processing request message (111) to the cooperation promoter 102. The cooperation promoter 102 received the processing request message checks whether there is a function capable of processing the request, among the pre-notified functions of the agent 103. It is assumed here that the process can be executed by using one of the functions notified by the agent 103 to the cooperation promoter 102. The cooperation promoter 102 transfers the processing request message (112) to the agent 113. The agent 103 received the processing request message (112) executes the process and returns an executed result (113) to the cooperation promoter 102. The cooperation promoter 102 received the processed result (113) from the agent 103 transfers (114) the processed result to the agent 101. A series of operations responsive to the processing request message (111) from the agent 101 is completed in the above manner.

In the above manner, cooperation processing of the agents 101 and 103 is executed by using the cooperation promoter 102 as intermediation. The communication protocol illustrated in FIG. 2 is only one example of the cooperation mechanism through intermediation. In Prior Art 4, other three cases of communication protocols using the cooperation mechanism through intermediation are described. An agent using the cooperation mechanism through intermediation is not necessary to have knowledge of the partner agent to be cooperated, and the cooperation method between the agents is determined by the cooperation promoter when executing the process. Therefore, all functions are not necessary to be designed and developed when the system is configured, and so a change in the system configuration and addition of new services can be dealt with easily without changing the processes to be executed by other agents. Further, even if some services are stopped at some agents, these services can be used by activating other alternative agents if they support such services.

FIG. 3 is a conceptual diagram illustrating a mobile agent described, for example, in Prior Art 3. In FIG. 3, reference numeral 121 represents an operation environment (user place) of a moving originating agent, reference numeral 122 represents an operation environment (server place) of a moving destination agent, reference numeral 123 represents a communication network interconnecting the moving originating agent execution environment 121 and the moving destination agent execution environment 122, reference numeral 124 represents a mobile client agent, reference numeral 125 represents a server agent, and reference numerals 126a and 126b represent an agent execution engine. The operation of the client agent 124 in the above system configuration will be described. First, the client agent 124 is activated by the agent execution engine 126a of the moving originating agent execution environment 121. If a moving method (in FIG. 3, go method) is executed in this activated state, the client agent 124 moves via the network 123 to the moving destination agent execution environment 122 defined as a moving destination, and continues to execute a process in cooperation with the server agent 125. Such an agent as the client agent 124 moving in an activated state to another agent execution environment and continuing to execute a process, is called a mobile agent.

Since a mobile agent can move to a desired site when necessary, software of this agent is not required to be distributed to or installed in, in advance, to a client or server requiring it. Since the agent itself executing a process moves to the execution environment, communication cost can be expected to be reduced. For example, in a frame work of a conventional client/server system, a plurality of messages are necessary to be exchanged between a client and a server in order for the client to access or update a file on the server. In contrast, the file update process can be executed if the mobile agent is moved once to the server, so that message communications are unnecessary for the file update process and there is no time required for the message exchange (Prior Art 3).

SUMMARY OF THE INVENTION

As compared to the object-oriented paradigm of Prior Art 1, the agent-oriented paradigm of Prior Art 2 provides an excellent concept mainly from the viewpoint of the cooperation mechanism through intermediation and the mobile agent. Use of the cooperation mechanism through intermediation facilitates to deal with a change in the system configuration and addition of new services, without changing the processes to be executed by other agents. It is also unnecessary for the mobile agent to distribute or install software in advance. As compared to an object, therefore, an agent is excellent in extendability and flexibility, and a new function can be easily implemented.

However, as stated in Prior Art 3, the disadvantage of the agent-oriented paradigm is a problem that "the whole operation of the system is undeterminable and unpredictable". This issue will be explained from the two viewpoints of the cooperation mechanism through intermediation and the mobile agent.

FIG. 4 is a diagram illustrating this issue associated with the cooperation mechanism through intermediation. Reference numerals 101, 103, 104, and 105 represent an agent, and reference numeral 102 represents a cooperation promoter. In this configuration, the agents 103, 104, and 105 notify (advertise (ask(X))) the cooperation promoter 102 of functions they can provide (110, 115, 116). The succeeding operation of issuing a processing request from the agent 101 and executing the process in cooperation with another agent will be described. It is assumed here that the agent 101 has no knowledge of the agent to which a processing request message is transmitted. In this case, the agent 101 first transmits (111) a processing request message (broker (ask (X))) to the cooperation promoter 102. The cooperation promoter 102 received the processing request message 111 checks whether three is the function capable of dealing with the processing request 111, among the functions pre-notified by the agents. If a plurality of agents, e.g., the agents 103, 104, and 105 can deal with the processing request 111 (such a state is called a contention between agents), the cooperation promoter 102 selects one of the plurality of agents capable of dealing with the processing request 111, in accordance with some evaluation criterion, or line them up, to request the selected agent to execute the process (117). The selected agent (in the example of FIG. 4, agent 104) returns (118) the executed result to the cooperation promoter 102 which in turn transfers (119) the result to the agent 101. Such a cooperation between agents is determined only in accordance with the states of agents activated and configured in the system when the process is executed. In other words, the system operation becomes undeterminable and the internal operation of the system is difficult to be predicted, as opposed to a conventional paradigm which pre-defines a call order. As the number of agents providing services overlapping with other agents increases and the number of contentions increases, the indefinite factors become large so that the system operation becomes more difficult to predict. Furthermore, as the number of agents increases, addition and change of agents are required to be performed by checking the interaction between a number of agents and analyzing various contention possibilities. Therefore, advantages of extendability and flexibility of the system configuration using the agent-oriented paradigm are cancelled out.

Next, the above problem of the agent-oriented paradigm will be described from the viewpoint of the mobile agent. On the side of the moving destination agent execution environment, a presence of the mobile agent may possibly become an indefinite factor of the system operation. The mobile agent moves asynchronously with the state of the moving destination agent execution environment, executes a process, and distinguishes from the moving destination agent execution environment when the process is completed. As stated earlier, since the cooperation between agents is determined only when a process is executed, some undesired interaction with the mobile agent in the moving destination agent execution environment may occur.

As described above, an agent is superior to an object in extendability and flexibility in the context of the cooperation mechanism through intermediation and the mobile agent, and in easy addition of new functions. However, the adverse effects of these functions make the whole system operation undeterminable and unpredictable. If the number of agents in particular becomes large as the system scale is increased, indefinite factors of the system operation increase, and the above adverse effects become conspicuous, lowing the agent merits of high flexibility and extendability.

It is an object of the present invention to provide a document management system having high extendability, flexibility, stability, and maintainability, capable of eliminating disadvantages of conventional technologies that the merits of easy system implementation and extension in configuring the system using the agent-oriented paradigm are lost as the number of agents in the expanded system increases, and capable of maintaining the merits of both the object- and agent-oriented paradigms.

The object of the invention can be achieved by providing a system configuration integrating an environment for executing an object and an environment for executing an agent, and means for executing an agent as an object (means for changing an agent into an object. The system configuration integrating an object execution environment and an agent execution environment allows development to be performed by using the merits of both the object- and agent-oriented paradigms. The means for changing an agent into an object executes the processes of an agent generating an undeterminable operation by replacing them with processes having fixed operations. Therefore, indefinite factors of an agent can be eliminated and system flexibility and extendability to be degraded by use of a number of agents can be recovered.

Specifically, the means for changing an agent into an object is constituted by the following means including:

(1) communication route determination means provided with a communication route table which stores correspondence between processing request messages issued by agents and transmission communication routes, said communication determination means determining a transmission communication route for a processing request message issued by an agent, by searching the communication route table;

(2) object communication means for receiving a message from another object and transmitting the message to another object via a communication route determined by said communication route determination means;

(3) agent communication means for receiving a message from another agent and transmitting the message to another agent via a communication route determined by said communication determination means; and (4) agent control means for receiving a processing request message to the agent via said object communication means or said agent communication means, activating the agent, and controlling the processing of the agent, and for determining a communication route by said communication route determination means and controlling the processing of issuing a message from the agent via said object communication means or said agent communication means.

By adding these means to an agent, the agent can be executed in the object execution environment. The cooperation mechanism through intermediation which is the function possessed by the agent does not operate on this agent because communication with another agent is performed via a communication route defined by the communication route determination means by referring to the communication route table. Accordingly, indefinite factors of this agent can be eliminated.

Next, a process of changing a mobile agent into an object will be described. The mobile agent is also changed into an object by adding the means for changing an agent into an object. An object obtained by changing an agent is pre-installed in the moving execution environment. With this configuration, cooperation processing is performed between the moving destination and a moving originating agent so that processing can be executed without moving the agent.

Although the moving agent can move with its internal information being contained therein and can continue the processing at the moving destination, these operation cannot be performed with only the above means (1) to (4). In order to solve this, the means for changing an agent into an object for the mobile agent is added with the following means including:

(5) internal information acquisition means for acquiring internal information of an agent moving to another environment and generating a message containing the internal information; and (6) internal information setting means for, when the massage generated by said internal information acquisition means is received from another object, setting the internal information of the agent contained in the message to the agent.

By adding the means (5) and (6), a message containing the internal information of the mobile agent can be transmitted when it moves so that only the internal information can be passed to the next moving destination to continue the processing at the moving destination.

By changing the mobile agent into an object by the above means, the mobile agent will not move. Therefore, indefinite factors of the mobile agent can be eliminated.

As an agent is changed into an object, the agent is executed in the object execution environment. In order to execute the processing request itself issued from another agent which issued a processing request to the subject agent, in the same manner even after being changed into an object, the means for changing an agent into an object is added with the following means including:

(7) representative communication means for receiving a processing request from another agent as a representative of the subject agent, transferring the received processing request to the subject agent, and sending back a processing result of the subject agent to the requesting agent; and (8) function notification means for notifying the function of the subject agent to the external.

A representative agent having the means (7) and (8) is provided in the agent execution environment in place of the subject agent. In place of the subject agent, the means (7) receives the processing request issued from another agent, and transfers it to the subject agent to execute the processing request. The means (8) can notify a cooperation promoter of the function of each agent and activate the agent via the cooperation promoter. As above, without changing the processing of another agent which issued a processing request to the subject agent, the subject agent can process the processing request from the other agent.

DESCRIPTION OF THE PREFERRED EMBODIMENTS

Embodiments of the invention will be described. The first embodiment will be described.

Figure 1:
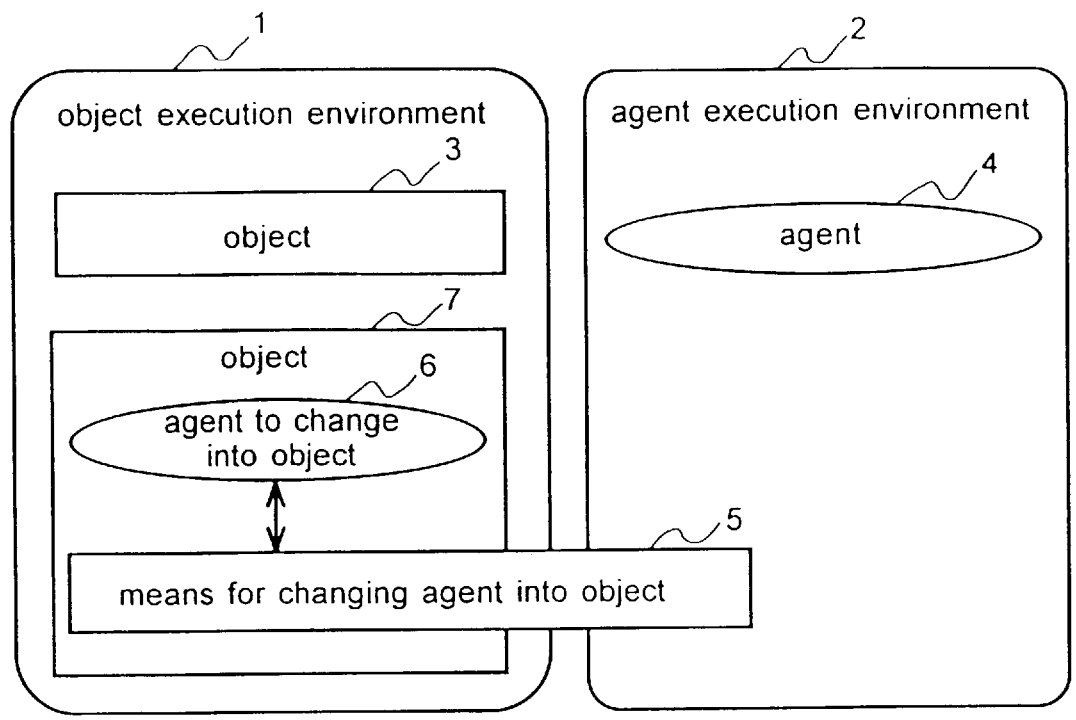
FIG. 1 is a diagram showing the configuration of a first embodiment of the invention.
Figure 2:
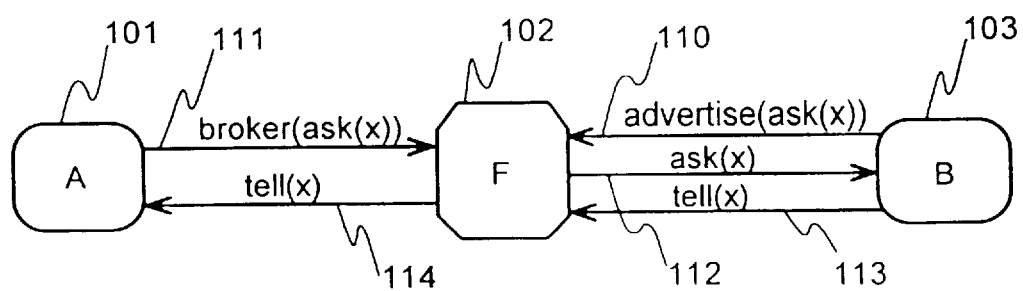
FIG. 2 is a conceptual diagram illustrating one example of conventional communications between agents using a cooperation mechanism through intermediation.
Figure 3:
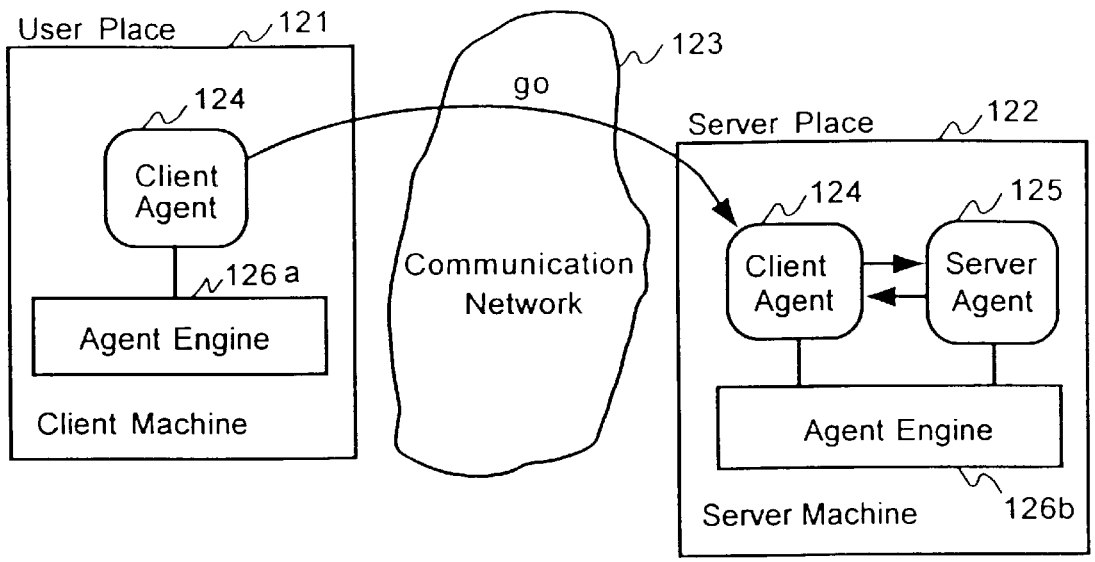
FIG. 3 is a conceptual diagram illustrating a conventional mobile agent.
Figure 4:
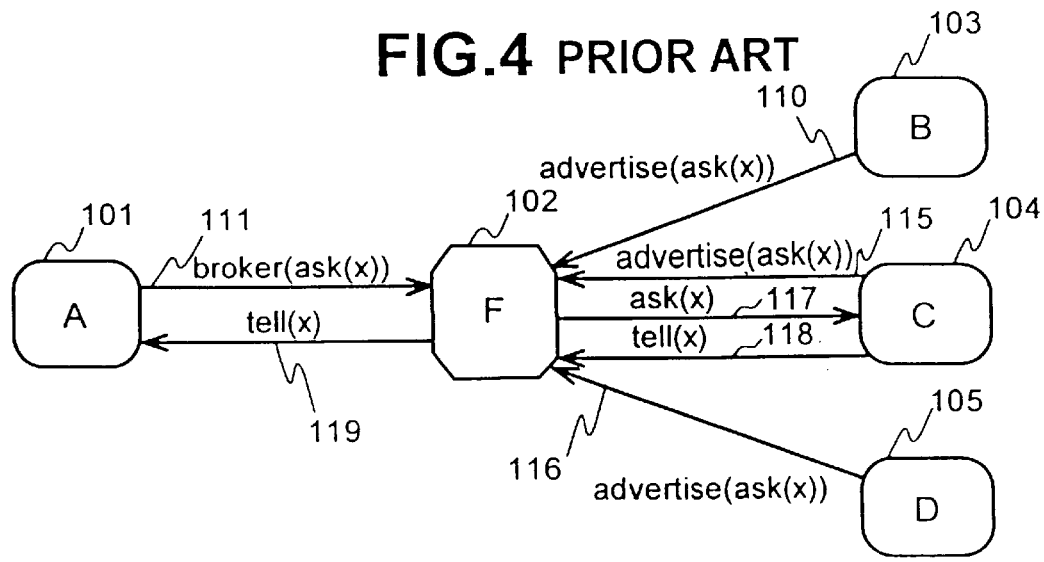
FIG. 4 is a conceptual diagram illustrating another example of conventional communications between agents using a cooperation mechanism through intermediation.

FIG. 1 is a block diagram showing the configuration of the first embodiment. In FIG. 1, reference numeral 1 represents an object execution environment for executing a module which is implemented with functions of object-oriented paradigm, and reference numeral 2 represents an agent execution environment for executing a module which is implemented with functions of agent-oriented paradigm. The object execution environment 1 may use ORB (Object Request Broker) products described in Prior Art 2 which are software for exchanging messages between objects on different platforms. The agent execution environment 2 may use an architecture of the system introduced as an application example of an agent-oriented system described in Prior Art 2. The object execution environment 1 and the agent execution environment 2 are integrated together to realize a system configuration in which an object 3 in the object execution environment 1 and an agent 4 in the agent execution environment 2 can operate in cooperation with each other. With such a system configuration, a system developer can retain the merits of both the object- and agent-oriented paradigms, for example, implementing a stable operation function by using objects and a function with high change occurrence frequency by using agents.

As described earlier, if a number of agents easy to implement are used in configuring a large scale system, indefinite factors of the system operation increase and the whole operation becomes unpredictable. Further, since the interaction between a number of agents is required to be checked, the merits of excellent flexibility and extendability of agents are lost. From the above reasons, agents such as those requiring a stable operation and having high change occurrence frequency are changed into objects. In this manner, a system having flexibility and extendability can be realized while maintaining system stability. Changing an agent into an object is realized by adding means 5 for changing an agent into an object to an agent 6 to be changed into an object. The agent 6 itself is not changed. The means 5 for changing an agent into an object has partially an entity in the agent execution environment in order to accept a processing request from another agent.

The means 5 for changing an agent into an object controls a process and a message input/output of the agent 6, to allow the agent 6 to be executable as an object 7 on the object execution environment 1. In this case, the means 5 for changing an agent into an object executes a process of the agent 6 which may cause an undeterminable operation, by replacing it with a process performing a definite operation. Specifically, a as process of determining a processing request destination by using the cooperation mechanism through intermediation is replaced with issuing a processing request to a pre-defined processing request destination, or a process moved to another execution environment by using the function of the mobile agent is replaced with issuing a processing request to an object pre-installed at a destination. In this manner, the function of the agent execution environment 2 is not used. The details of these processes will be described in connection with the third and fourth embodiments. The means for changing an agent into an object eliminates indefinite factors associated with the agent 6, and the degrading system flexibility and extendability can be recovered.

Next, the second embodiment will be described.

In the document management system of the first embodiment, the object execution environment is configured by general objects and other objects changed from agents by the means for changing an agent into an object. In the document management system of the first embodiment, however, when the agent process is changed into the object process, the processes of all objects which activated this agent are required to be changed. Therefore, a large scale system is associated with a problem of lowered system maintainability.

This problem is solved by the document management system of the second embodiment in which management/control objects are provided which collectively manage objects and agents changed from objects, in the unit of function, to thereby prevent maintainability of a large system from being lowered.

Figure 5:
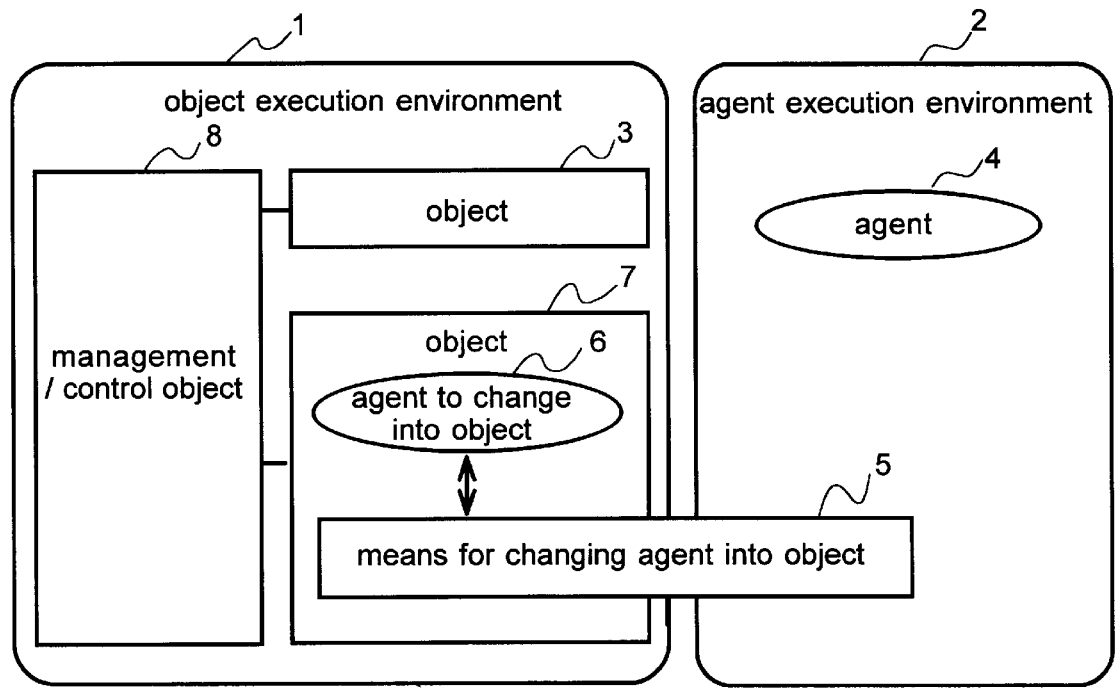
FIG. 5 is a diagram showing the configuration of a second embodiment of the invention.

The configuration of this embodiment is shown in FIG. 5. The document management system of this embodiment has the configuration that a management/control object 8 is added to the object execution environment of the document management system shown in FIG. 1.

The management/control object 8 stores process dispatch information (not shown) containing the procedure to be executed upon input of a process and the name of an object which executes the process. The process of each of the objects is controlled in accordance with the process dispatch information. If the procedure of processes is changed, if an activation of an object becomes unnecessary, or if a new object changed from an agent by the means for changing an agent into an object is added, the process dispatch information is changed so that the procedure of processes can be changed easily and a system having high maintainability can be configured.

Next, the third embodiment will be described.

In this embodiment, an example of changing an agent (not a mobile agent) using the cooperation mechanism through intermediation into an object, will be described. The agent changed from an object is activated upon reception of a processing request from an object.

The configuration before being changed into an object and the procedure of processes will be described.

Figure 6:
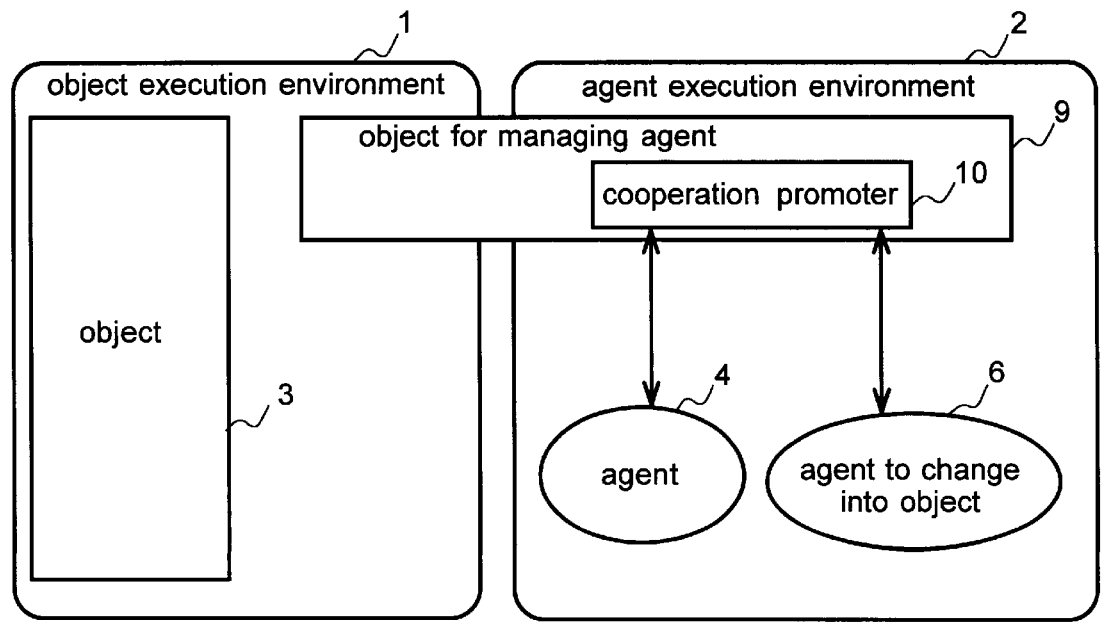
FIG. 6 is a diagram showing the configuration of a third embodiment of the invention before an agent is changed into an object.

FIG. 6 is a block diagram showing the configuration before an agent is changed into an object, according to this embodiment. In FIG. 6, reference numeral 1 represents an object execution environment, reference numeral 2 represents an agent execution environment, reference numeral 3 represents an object (inclusive of the management/control object of the second embodiment), reference numeral 4 represents an agent, reference numeral 6 represents an agent to be changed into an object, reference numeral 9 represents an object for managing an agent, and reference numeral 10 represents a cooperation promoter. The agent managing object 9 has an environment for executing an agent, the environment being implemented as an object. The agent managing objects includes common services such as the cooperation promoter 10, an agent execution engine, an environment for communications between agents, and the like. The agent management object 9 may use part of the agent execution environment of the system incorporated as one application of the agent-oriented system described in Prior Art 3.

Figure 7:
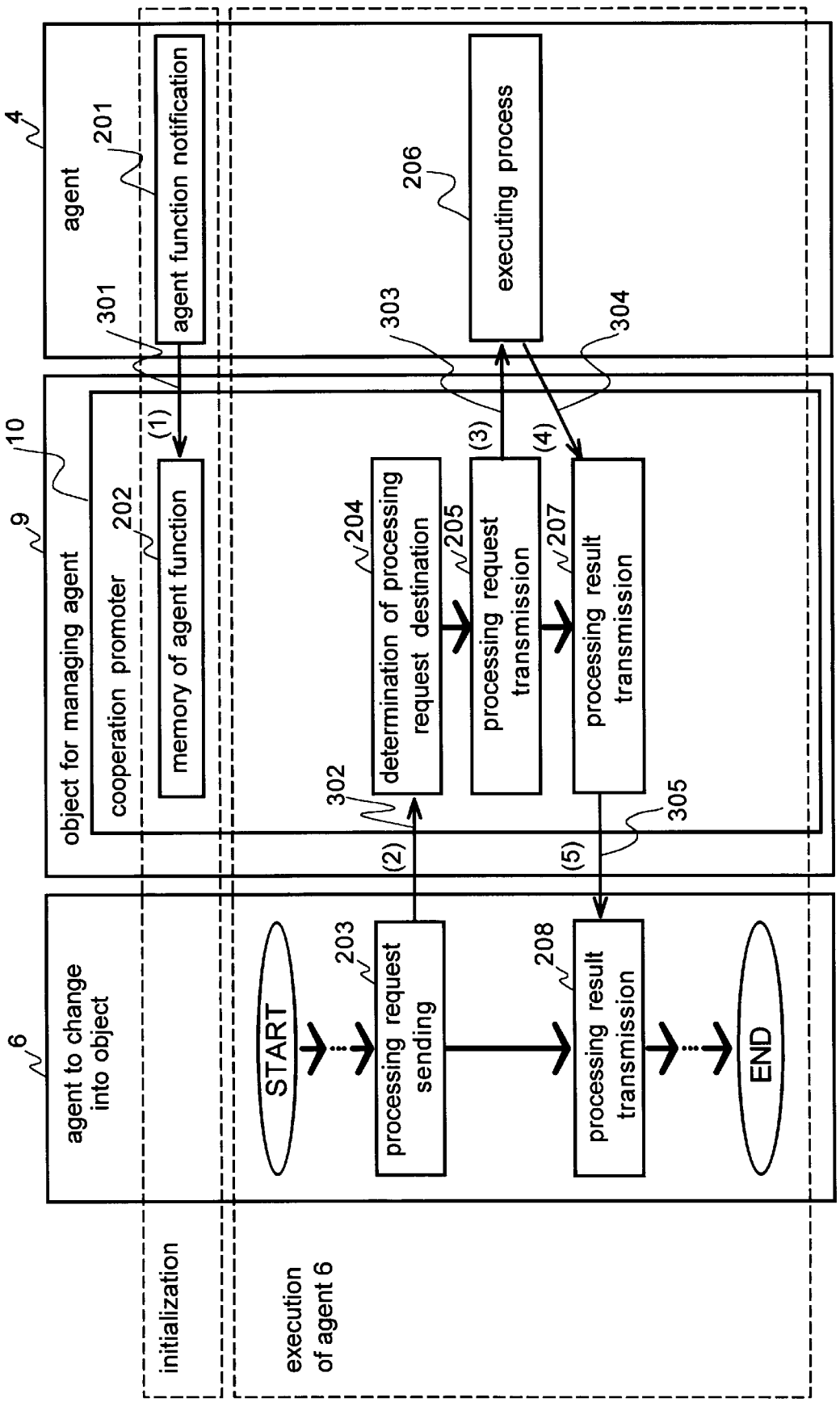
FIG. 7 is a diagram illustrating the operation of the configuration shown in FIG. 6.

The procedure of processes in this configuration will be described with reference to FIG. 7 in which the agent 6 to be changed into an object issues a processing request to the cooperation promoter 10 during the process and executes the process in cooperation with the agent 4. In FIG. 7, an arrow of thin line indicates communication between elements, the communication being executed in the order of serial number in parenthesis affixed to each arrow. An arrow of bold line indicates the procedure in the agent or cooperation promoter. The cooperation process of an agent using the cooperation promoter is executed by a method disclosed, for example, in Prior Art 4.

Prior to cooperation processes between agents through intermediation, each agent notifies the cooperation promoter of functions supported by the agent at the initializing timing of the cooperation promoter, such as when the system is set up. In the example shown in FIG. 7, the agent 4 notifies (301) the cooperation promoter 10 of functions supported by the agent 4, at a process 201. The cooperation promoter 10 received the notice 301 stores in its internal database (not shown) the agent functions received at a process 202.

Assuming that the above initialization process has been completed, the process by the agent 6 to be changed into an object will be described. The agent 6 transmits a processing request 302 to the cooperation promoter 10 during its operation period at a process 203. The cooperation promoter 10 received the processing request 302 determines a destination of the processing request 302 at a process 204 by referring to the internal database (not shown). In this example, it is assumed that the agent 4 is determined as the request destination. At a process 205, the cooperation promoter 10 transfers the processing request 303 to the agent 4. The agent 4 received the processing request 303 executes the process and returns the processes result 304 to the cooperation promoter 10. At a process 207, the cooperation promoter 10 transfers the processed result 305 to the agent 6 to be changed into an object. At a process 208, the agent 6 received the processed result 305 performs the following process in accordance with the processed result.

Next, the operation of changing into an object the agent 6 which has processed in the above manner in cooperation with the agent 4 via the cooperation promoter 10, will be described.

Figure 8:
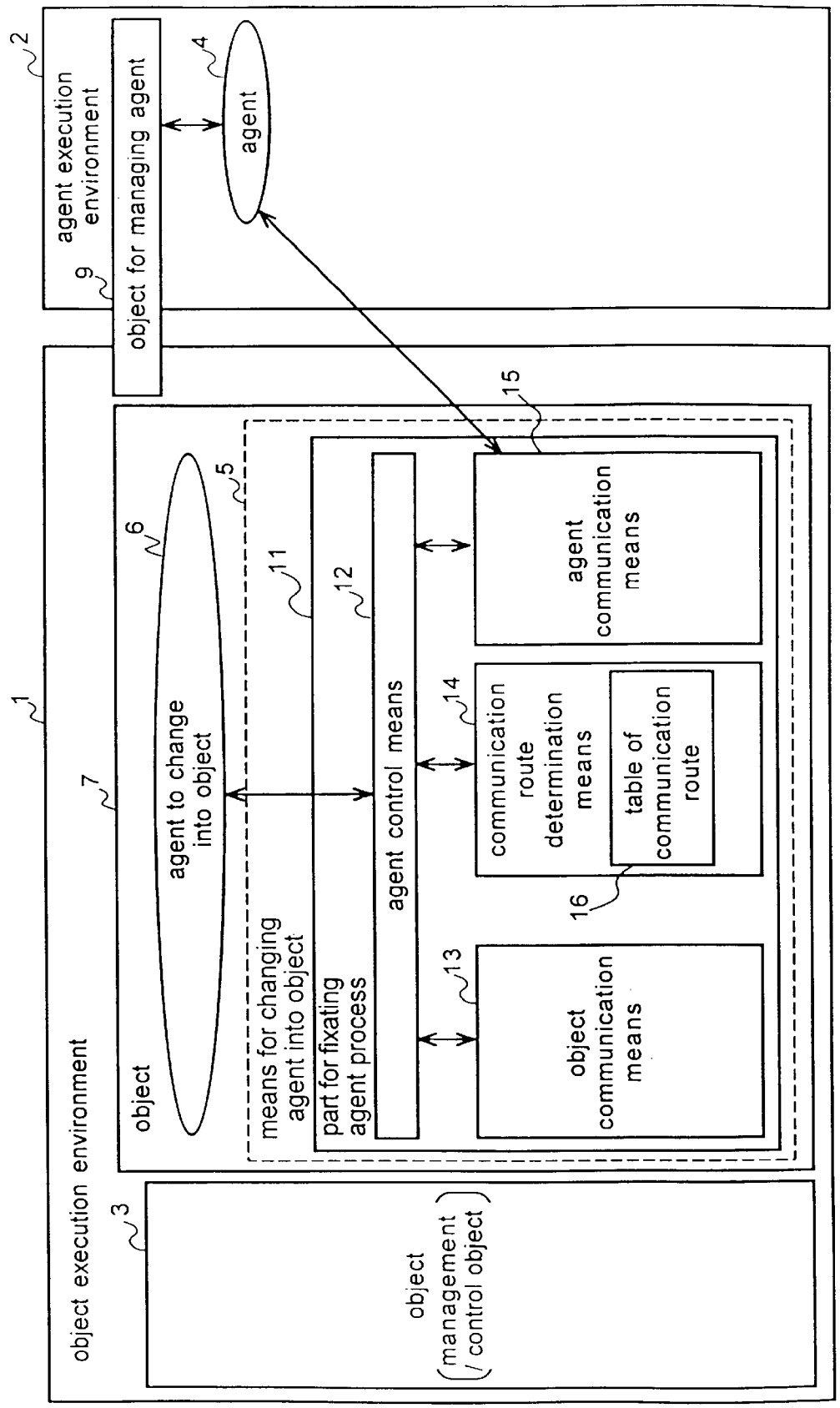
FIG. 8 is a diagram showing the configuration of the third embodiment after an agent is changed into an object.

FIG. 8 is a block diagram showing the configuration after the agent is changed into an object according to the embodiment. In FIG. 8, reference numeral 1 represents an object execution environment, reference numeral 2 represents an agent execution environment, reference numeral 3 represents an object (inclusive of the management/control object of the second embodiment), reference numeral 4 represents an agent, reference numeral 5 represents means for changing an agent into an object, reference numeral 6 represents an agent to be changed into an object, reference numeral 7 represents an object changed from an agent, and reference numeral 9 represents an agent management object. By adding the means 5 for changing an agent into an object to the agent 6 to be changed into an object, the agent 6 is changed into the object 7 which 99 can operate in the object execution environment 1.

Reference numeral 11 represents a part for fixating an agent process. This part 11 is implemented as an object. In this embodiment, the object 7 is activated in response to a processing request from another object, and is not activated by a processing request from an agent. Therefore, a part of the means 5 for changing an agent into an object is not included in the agent execution environment 2. Namely, the means 5 for changing an agent into an object is shared by the part 11 for fixating an agent process.

The part 11 for fixating agent process is constituted of agent control means 12, object communication means 13, communication route determination means 14, and agent communication means 15.

Figure 9:
FIG. 9 shows an example of a communication route table 16 in the configuration shown in FIG. 8.

The communication route determination means 14 stores a communication route table 16. An example of the communication route table 16 is shown in FIG. 9. The communication route table 16 is a correspondence table between a processing request message (in FIG. 9, e.g., "broker (ask (X))") issued by the agent 6 to be changed into an object and a communication route for transmission (in FIG. 9, e.g., "agent 4"). The communication route table 16 is generated by a system manager by using a tool having: means for deriving a cooperation part with another agent from a process of the agent 6 to be changed into an object when the part 11 for fixating an agent process is generated; means for collecting, from the cooperation promoter, processing request destination information of the cooperation part which seeks a processing request destination by using the function of the cooperation promoter; and means for making a system manager to select one of a plurality of agents, if the processing request can be responded by a plurality of agents.

Figure 10:
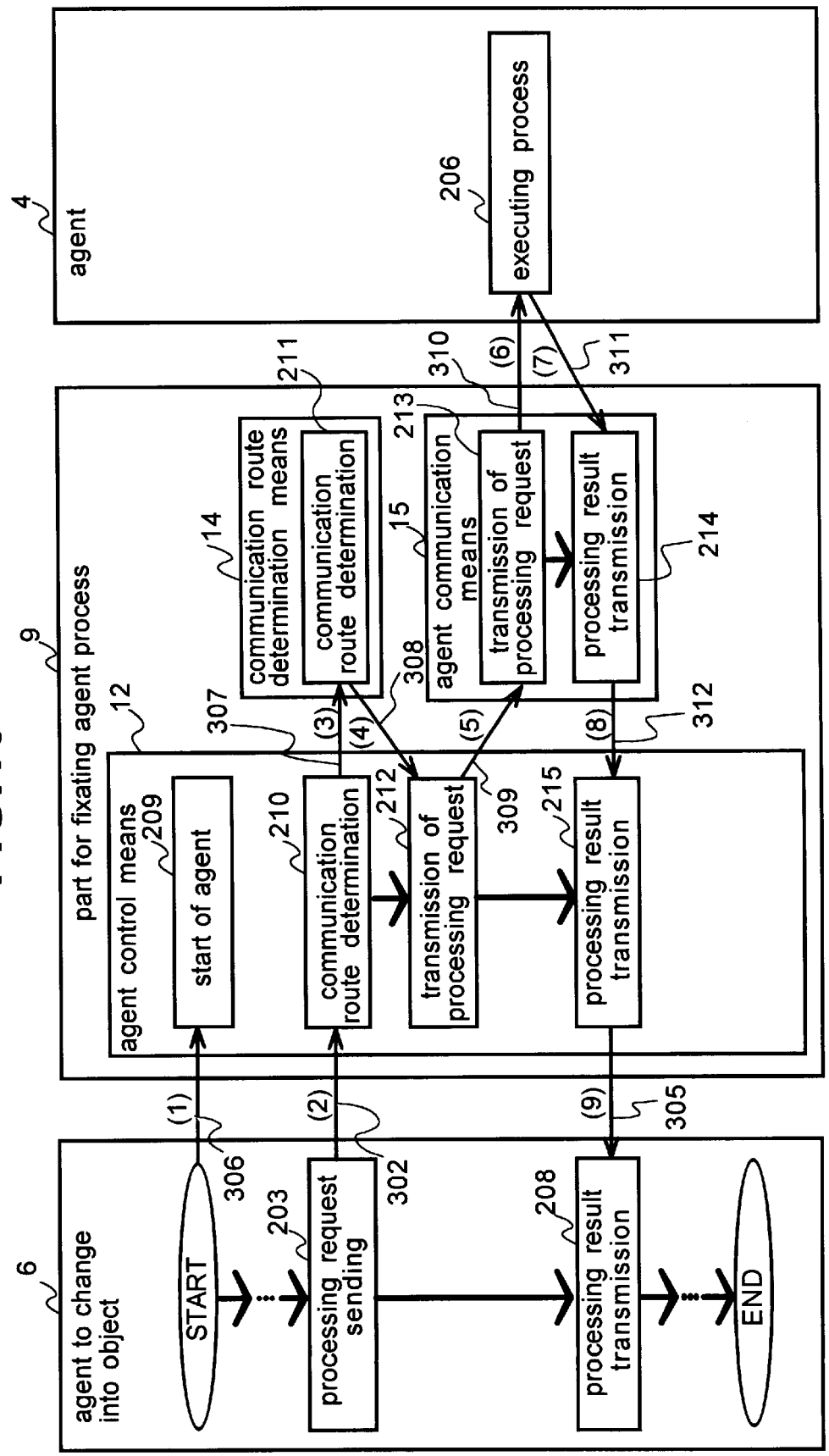
FIG. 10 is a diagram illustrating the operation of the configuration shown in FIG. 8.

Next, similar to the above-described procedure of processes before an agent is changed into an object, the procedure of other processes will be described with reference to FIGS. 10 in which the agent 6 to be changed into an object issues a processing request during its operation and executes the process in cooperation with the agent 4.

In response to a processing request from another object, the agent control means 12 activates (306) the agent 6 to be changed into an object at a process 209.

Since any change is not added to the process when an agent is changed into an object, the agent 6 transfers a processing request 302 to the cooperation promoter (indicated at 10 in FIG. 7) at a process 203, similar to the above-described process before an agent is changed into an object. The processing request 302 transmitted from the agent 6 is received by the agent control means 12. In this manner, messages transmitted from the agent 6 are all received by the agent control means 12. The agent control means 12 analyzes the processing request 302 transmitted from the agent 6, and if the processing request is judged to be directed to the cooperation promoter 10, transfers at a process 210 the processing request not to the cooperation promoter 10 but to the communication route determination means 14.

At a process 211, the communication route determination means 14 determines a destination of the processing request 307 by referring to the communication route table (indicated at 16 in FIG. 9). For example, if the processing request 302 transmitted from the agent 6 is "broker (ask (X))", the communication route determination means 14 determines "agent 4" as the processing request destination by referring to the communication route table 16. The communication route determination means 14 sends back (308) the determined processing request destination to the agent control means 12.

The agent control means 12 received the processing request destination from the communication route determination means 14 judges at a process 212 whether the processing request destination is an object or an agent, and transfers the processing request 302 supplied from the agent 6 to the object communication means 13 if the judged result indicates an object, and to the agent communication means 15 if an agent. In this embodiment, since the processing request destination is the agent 6, the processing request 309 is transferred to the agent communication means 15.

Upon transfer of the processing request 309 from the agent control means 12, the agent communication means 15 transfers (310) at a process 213 the processing request 309 further to the agent 4 determined as the processing request destination by the communication determination means 14.

Upon reception of the processing request 310 from the agent communication means 15, the agent 4 executes at a process 206 the process for the processing request 310 and returns back the processed result 311 to the agent communication means 15.

The agent communication means 15 received the processed result 311 from the agent 4 transfers at a process 214 the processed result 312 to the agent control means 12.

Upon reception of the processed result 312 from the agent communication means 15, the agent control means 12 returns back at a process 215 the processed result 312 to the agent 6 to be changed in an object. In this manner, also the message transmission to the agent 6 is performed by the agent control means 12. The agent control means 12 controls both the agent 6 for activation and message reception thereof and the constituent elements of the part 11 for fixating an agent process.

Upon reception of the processed result 305 from the agent control means 12, the agent 6 continues at a process 208 to execute the process in accordance with the received processed result, in the manner similar to the case before the agent is changed into the object.

The process to be executed by the agent 6 changes neither before it is changed into an object nor after it is changed into an object. However, after it is changed into an object, the agent control means 12 of the part 11 for fixating an agent process added to the agent 6 hooks the processing request to the cooperation promoter, and thereafter the communication route determination means 14 determines a processing request destination. Therefore, after the agent is changed into an object, the processing request is not transmitted to the cooperation promoter, but the communication route determination means 14 determines a destination of the processing request by referring to the communication route table 16 pre-defined by a system manager. The processing request destination is unanimously fixed for each processing request. Therefore, indefinite factors of the system can be eliminated which otherwise occur if the agent 6 to be changed into an object uses the cooperation mechanism through intermediation.

Next, the fourth embodiment will be described.

In this embodiment, the case where a mobile agent is changed into an object will be described. It is assumed here that after the mobile agent is changed into an object, it is activated by a processing request from the object.

First, the configuration before the mobile agent is not changed into an object and the procedure of processes will be described. The processes of the mobile agent described herein are performed by a method disclosed, for example, in Prior Art 3.

Figure 11:
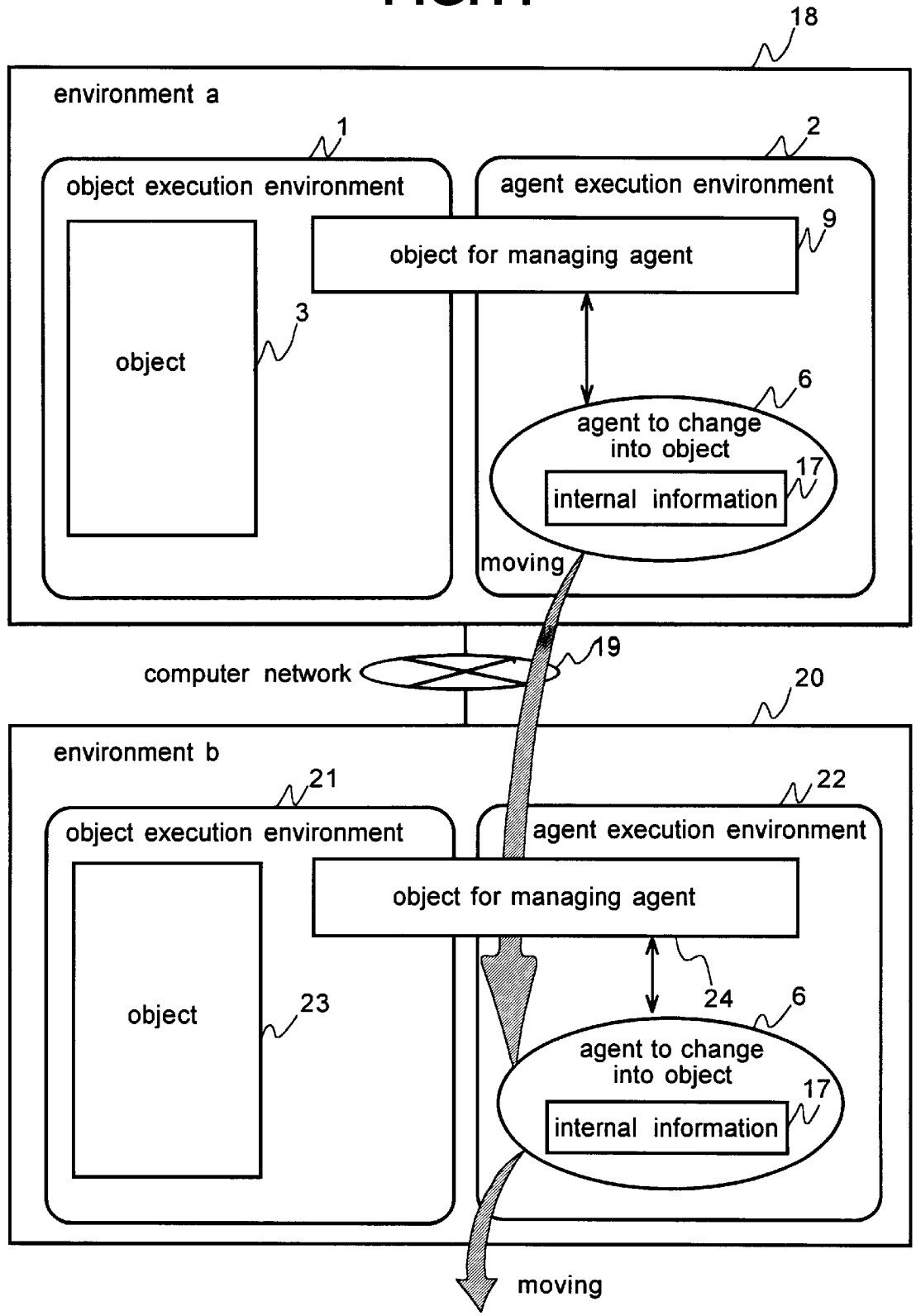
FIG. 11 is a diagram showing the configuration of a fourth embodiment of the invention before an agent is changed into an object.

FIG. 11 is a block diagram of the configuration of this embodiment before an agent is changed into an object. In FIG. 11, environments a 18 and b 20 are a computer environment interconnected by a computer network 19. The environment a 18 includes an object execution environment 1, an agent execution environment 2, an object (inclusive of the management/control object of the second embodiment) 3, an agent 6 to be changed into an object, and an object 9 for managing an agent. The environment b 20 includes an object execution environment 21, an agent execution environment 12, an object 23, and an object 24 for managing an agent.

In this configuration, consider the case wherein the agent 6 to be changed into an object, which is a mobile agent, operates in the agent execution environment 2 of the environment a 18. As the agent 6 executes a moving method during its operation, the agent intercepts to execute the process, stores the state at the intercept time (manages as internal information 17), and moves to the destination (in this example, the agent environment 22 of the environment b 20). As the agent 6 reaches the destination, the process resumes immediately after the moving method. As the agent 6 executes again the moving method, it moves further to the next environment.

An example of changing the agent 6, which is a mobile agent executing the process while moving to other environments, into an object will be described in the following.

Figure 12:
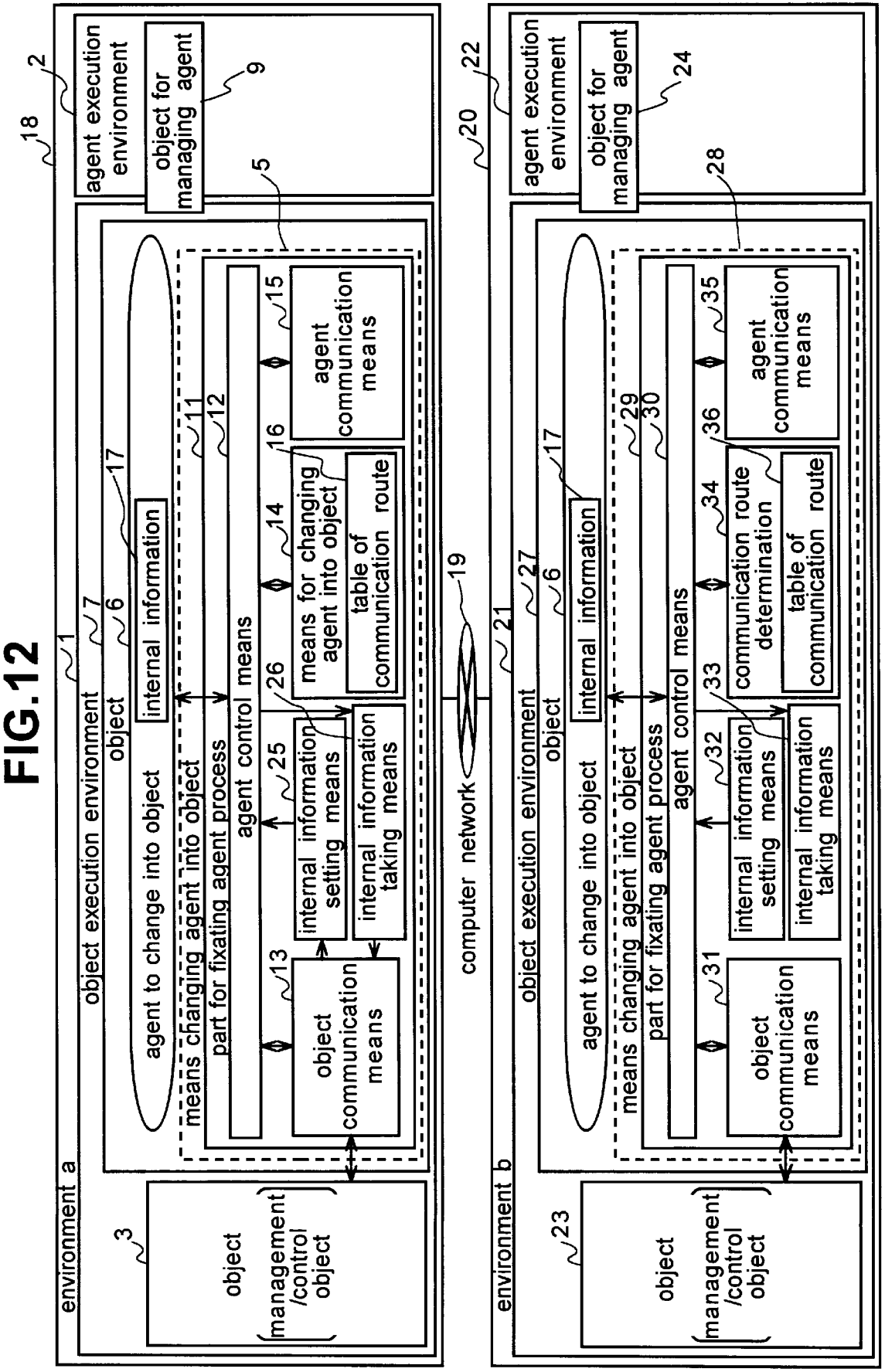
FIG. 12 is a diagram showing the configuration of the fourth embodiment after an agent is changed into an object.

FIG. 12 is a block diagram showing the configuration of this embodiment after the agent is changed into an object. In FIG. 12, environments a 18 and b 20 are a computer environment interconnected by a computer network 19, and each include an object execution environment (1, 21) and an agent execution environment (2, 22). Each execution environment includes an agent management object (9, 24) and an object (3, 23). In the object execution environment 1 of the environment a 18, means 5 for changing an agent into an object is added to the agent 6 to change the agent 6 into an object.

Reference numeral 11 represents a part for fixating an agent process. In this embodiment, the object 7 is activated in response to a processing request from another object, and is not activated by a processing request from an agent. Therefore, a part of the means 5 for changing an agent into an object is not included in the agent execution environment 2. Namely, the means 5 for changing an agent into an object is shared by the part 11 for fixating an agent process.

The part 11 for fixating an agent process has six elements, including internal information setting means 25 and internal information taking means 26, in addition to the agent control means 12, object communication means 13, communication route determination means 14, and agent communication means 15, respectively of the third embodiment. A difference of the configuration between the third embodiment and this embodiment is an addition of the internal information setting means 25 and the internal information taking means 26. Addition of these means 25 and 26 enables to change the mobile agent into an object. Also with this configuration, an agent using the function of the cooperation mechanism through intermediation can be changed into an object, by the similar procedure of processes described with the third embodiment.

The agent 6 to be changed into an object stores therein the internal information 17 representative of the execution state. The communication route determination means 14 stores therein a communication route table 16.

With the system constructed as above, in order to change the mobile agent into an object, an object 27 changed from the agent 6 in the environment b 20 which is a destination of the agent 6 is pre-installed in the environment b 20. The object 27 is changed from the agent 6 by means 28 for changing an agent into an object. The means 28 for changing an agent into an object is equivalent to a part 29 for fixating an agent process. This part 29 is constituted of agent control means 30, object communication means 31, internal information setting means 32, internal information taking means 33, communication route determination means 34 (inclusive of a communication route table 36), and agent communication means 35. Although the configurations of the object 7 in the environment a 18 and the object 27 in the environment b 20 are the same, the process contents of the elements of the means (5, 28) for changing an agent into an object in both the environments become different depending upon the difference between both the environments.

Figure 13:
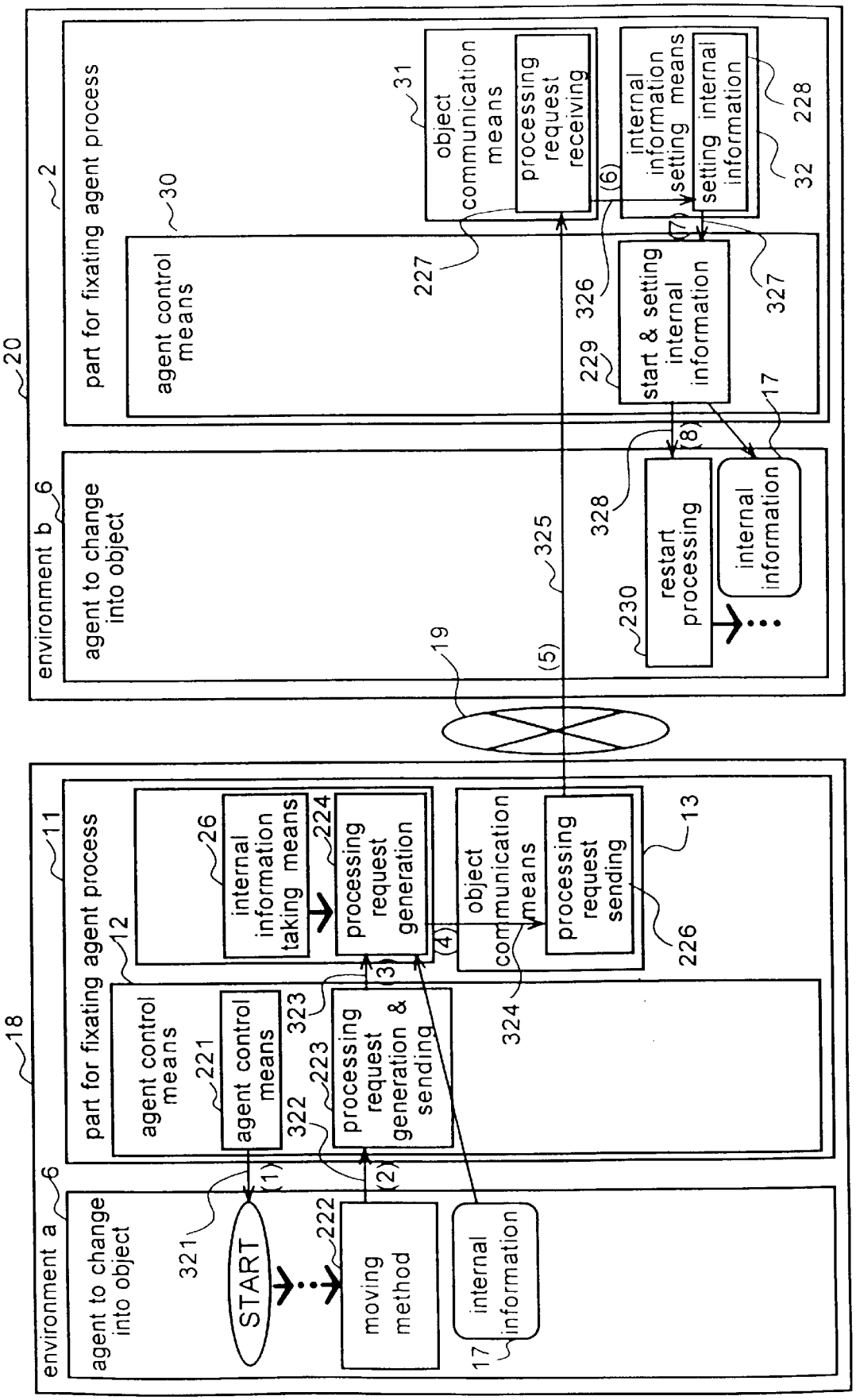
FIG. 13 is a diagram illustrating the operation of the configuration shown in FIG. 12.

Next, the procedure of processes of changing the agent 6 moving from the environment a 18 to the environment b 20 and executing the process, into an object will be described with reference to FIG. 13.

Upon a processing request from another object, the agent control means 12 activates (321) at a process 221 the agent 6 to be changed into an object.

The agent 6 to be changed into an object executes a moving method at a process 222 to move to the environment b 20, similar to the case before it is changed into an object.

As the agent control means 12 receives a moving notification (322) to the environment b 20 from the agent 6, the agent control means 12 transfers at a process 223 the moving notification 323 to the internal information taking means 26, instead of moving the agent 6 to the environment b 20.

The internal information taking means 26 received the moving notification 323 takes at a process 224 the internal information 17 from the agent 6, and generates a processing request 324 to the destination in accordance with the internal information 17 and information added to the moving notification 323. The internal information is information necessary for the agent to resume the process at the destination starting from an intercepted step of the process. For example, the information includes the states of all memories the agent 6 used, a pointer to the intercepted step, and the like. If the agent 6 to be changed into an object is a mobile agent, it is necessary to ensure the execution of a process even at different computer platform environments. Therefore, the internal information 17 does not contain information dependent upon each computer environment. Assuming that the method described in Prior Art 3 is used (in which a mobile agent is enciphered at the originating environment into a specific transfer format code and the agent received at the destination environment is decoded which is then interpretatively analyzed and executed by an execution engine), the internal information taking means 26 may generate a processing request message by deriving, as the internal information 17, information used by the execution engine for resuming the intercepted process, from the agent 6 to be changed into an object. The processing request 234 generated in the above manner is passed to the object communication means 13.

The object communication means 13 transmits (325) the received processing request 324 to a destination of the agent 6 designated by the information added to the moving notification.

The processing request 325 transmitted from the object communication means 13 is received by the object communication means 31 of the part 29 for fixating an agent process at the destination environment b 20. The object communication means 31 received the processing request 325 transfers at a process 227 the processing request 326 to the internal information setting means 32.

The internal information setting means 32 received the processing request 326 derives at a process 228 the internal information 17 of the agent 6 from the processing request 326, and prepares for burying the internal information 17 in the agent 6 to be activated. For example, in the above-described agent moving method, the internal information 17 is passed to the execution engine which interpretatively analyzes and executes the mobile agent. After the internal information is passed, the processing request 327 is transferred to the agent control means 30.

The agent control means 30 received the processing request 327 activates (328) at a process 229 the agent 6 to be changed into an object.

The activated agent 6 resumes the process starting from the intercepted step in accordance with the set internal information.

In the above manner, only the internal information 17 is passed by the internal information taking means 26 and internal information setting means 32, to the object 27 pre-installed at the destination, to thereby resume the process. The mobile agent is not moved to the destination but it is installed as an object at the destination. Therefore, the mobile agent will not asynchronously move to or from the destination environment so that possible indefinite elements can be eliminated.

Next, the fifth embodiment will be described.

In this embodiment, an example of changing an agent receiving a processing request from another agent, into an object will be described. In the third and fourth embodiments, an agent changed into an object is activated by a processing request from the object. However, the agent changed into an object may be activated from another agent. This embodiment pertains to the latter case.

Figure 14:
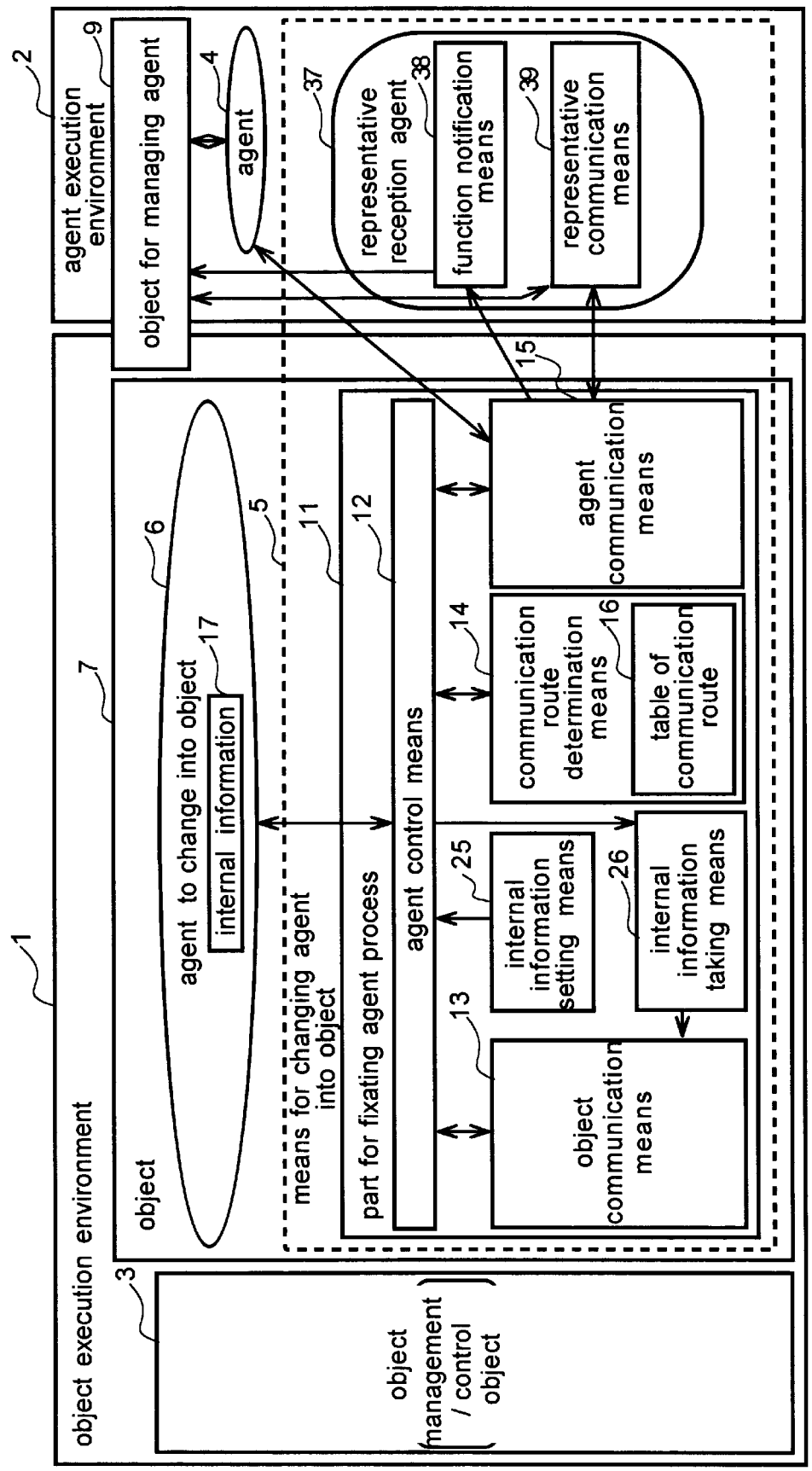
FIG. 14 is a diagram showing the configuration of a fifth embodiment of the invention.

FIG. 14 is a block diagram of the configuration of this embodiment after an agent is changed into an object. In FIG. 14, as compared to the elements contained in the environment a (indicated at 18 in FIG. 12) of the fourth embodiment, a representative reception agent 37 is added to the means 5 for changing an agent into an object. The representative reception agent 37 includes function notification means 38 and representative communication means 39. In this embodiment, the means 5 for changing an agent into an object has two elements, including a part 11 for fixating an agent process and a representative reception agent 37.

The representative reception agent 37 has two functions. One is to notify the agent management object 9 (cooperation promoter thereof) of the function supported by the agent 6 when the representative reception agent is initialized. The other is to receive a processing request from another agent 4 or agent management object 9 (cooperation promoter thereof) and transfer it to the agent 6. These two functions of the representative reception agent 37 will be described in the following.

Figure 15:
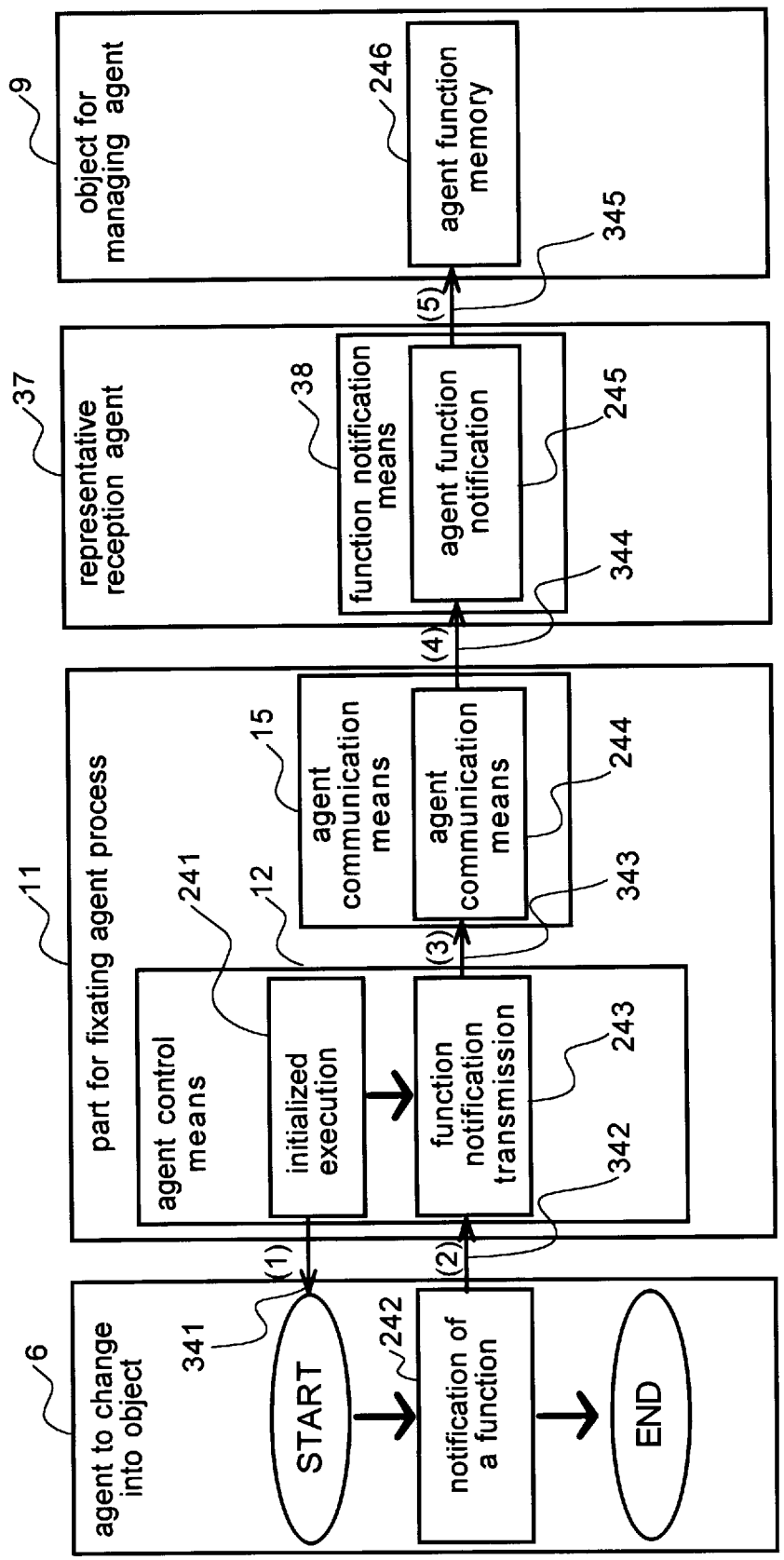
FIG. 15 is a diagram illustrating the operation of the configuration shown in FIG. 14.

First, the procedure of processes of notifying the agent management object 9 of the support function will be described with reference to FIG. 15. As described with the third embodiment, prior to a cooperation process between agents through intermediation, at the initializing timing of the cooperation promoter such as a system activation, each agent notifies the agent management object 9 (cooperation promoter thereof) of the functions supported by the agent. At this timing, the agent control means 12 activates (341) at a process 214 the agent 6 for its initialization process.

For the initialization process, the activated agent 6 transmits at a process 242 a function notification 342 regarding the support functions to the agent managing object 9.

The function notification 342 transmitted from the agent 6 to the agent managing object 9 is received by the agent control means, and transferred at a process 243 to the agent communication means 15.

The agent communication means 15 received the function notification 343 transfers at a process 244 the function notification 344 to the function notification means 38.

The function notification means 38 received the function notification 344 notifies (345) at a process 245 the agent managing object 9 of the functions as the functions supported by the representative reception agent 37.

The agent managing object 9 received the notification 345 stores at a process 246 the received agent functions in its internal database (not shown).

With the above processes, it is possible for the function notification means 38 to notify the agent managing object 9 of the support functions of the agent 6 as the support functions of the representative reception agent 37.

Next, the processes will be described when a processing request is received from another agent 4 or agent managing object 9. With the above function notification, the representative reception agent 37 is registered in the agent management object 9 as an agent having the functions supported by the agent 6. The representative reception agent 37 is given the same name as the agent 6. In the above manner, a processing request from another agent 4 to the agent 6 can be received, directly or via the agent managing object 9, by the representative reception agent 37. The processing request received by the representative reception agent 37 is passed by the representative communication means 39 to the agent control means 12 via the agent communication means 15. In response to the processing request, the agent control means 12 activates the agent 6. The succeeding processes are the same as the third and fourth embodiments. Lastly, the processed result is received by the representative communication means via the agent communication means 15, and sent back to the processing requested side.

As above, the added representative reception agent is used as a representative of the agent to be changed into an object. Therefore, without rewriting the processes of another agent which issued a processing request to the agent to be changed into an object, it becomes possible to receive the processing request from the other agent directly or via the agent managing object and to activate the agent after it is changed into an object.

Next, the sixth embodiment will be described.

In this embodiment, a digital library system is used as a particular example of the document management system. The following description explains how the digital library system incorporates the system configuration integrated with the object and agent execution environments and the means for changing an agent into an object in the above embodiments.

The digital library system of this embodiment is a system in which documents are stored in a database in the form of electronic data and any user can easily access the database and obtain desired information (multi-media information) via a network. The digital library system has recently been studied and developed widely, and its basic and peripheral technologies are still under development. In developing such a system, a spiral model is often used which determines the system configuration and functions through repetitive tests and evaluations. Therefore, the system functions tend to be frequently extended. Such a system requires an architecture of high extendability and flexibility in order to facilitate function extension and modification.

Once a digital library system is introduced, it is used for a long period of time while the functions are being extended. It is therefore necessary that such a system has an architecture of high stability and maintainability.

As above, a digital library system requires two types of performances, one being extendability and flexibility and the other being stability and maintainability. In terms of a time domain, of these two types of performances, the extendability and flexibility become important at the development phase and function extension phase, and the stability and maintainability become important at the practical operation phase. The digital library system is also characterized in multi-functions and large scale. Even for such a multi-function and large scale digital library system, the extendability, flexibility, stability, and maintainability are required to be retained.

A digital library system satisfying the above requirements is realized by using the system configuration integrated with the agent and object execution environments. Of these environments, the agent has extendability and flexibility better than the object, in the context of two points of the cooperation mechanism through intermediation and the mobile agent. Therefore, new functions can be easily implemented. Using this merit, the agent is implemented with the functions which are determined through repetitive tests and evaluations, i.e., the functions whose basic and peripheral technologies or specifications and fabrication methods are still not established. On the other hands, the functions whose specifications and fabrication methods are already established are implemented with the object. By selectively using agents and objects in the above manner, the initial configuration of a multi-function and large scale system can be realized while retaining extendability and flexibility at the development phase.

Use of agents makes the whole operation undeterminable and unpredictable. This problem becomes conspicuous if indefinite factors of the system operation increases as the system scale becomes large and the number of agents increases. The merits of high flexibility and extendability of agents are therefore lost.

Problems of inability of maintaining sufficient flexibility, extendability, stability, and maintainability may occur just before the practical operation phase or as the number of agents increases. These problems can be dealt with by changing agents into objects. Agents to be changed into objects are selected from agents other than those having a process greatly dependent upon the function specific to the agent which function may be greatly degraded if the agent is changed into an object. In a large scale digital library system with its basic and peripheral technologies being under development, if functions whose specifications and fabrication methods are not established are implemented by agents, the number of agents becomes very large. The means for changing an agent into an object can therefore eliminate indefinite factors of agents, and recover system flexibility and extendability which otherwise degraded by a use of a number of agents. Therefore, a system configuration of high stability and maintainability can be realized at a practical operation phase.

Next, an example of the digital library system will be described which satisfies the above-described development approach and incorporates the system configuration integrating the agent and object execution environments and having the means for changing an agent into an object.

Figure 16:
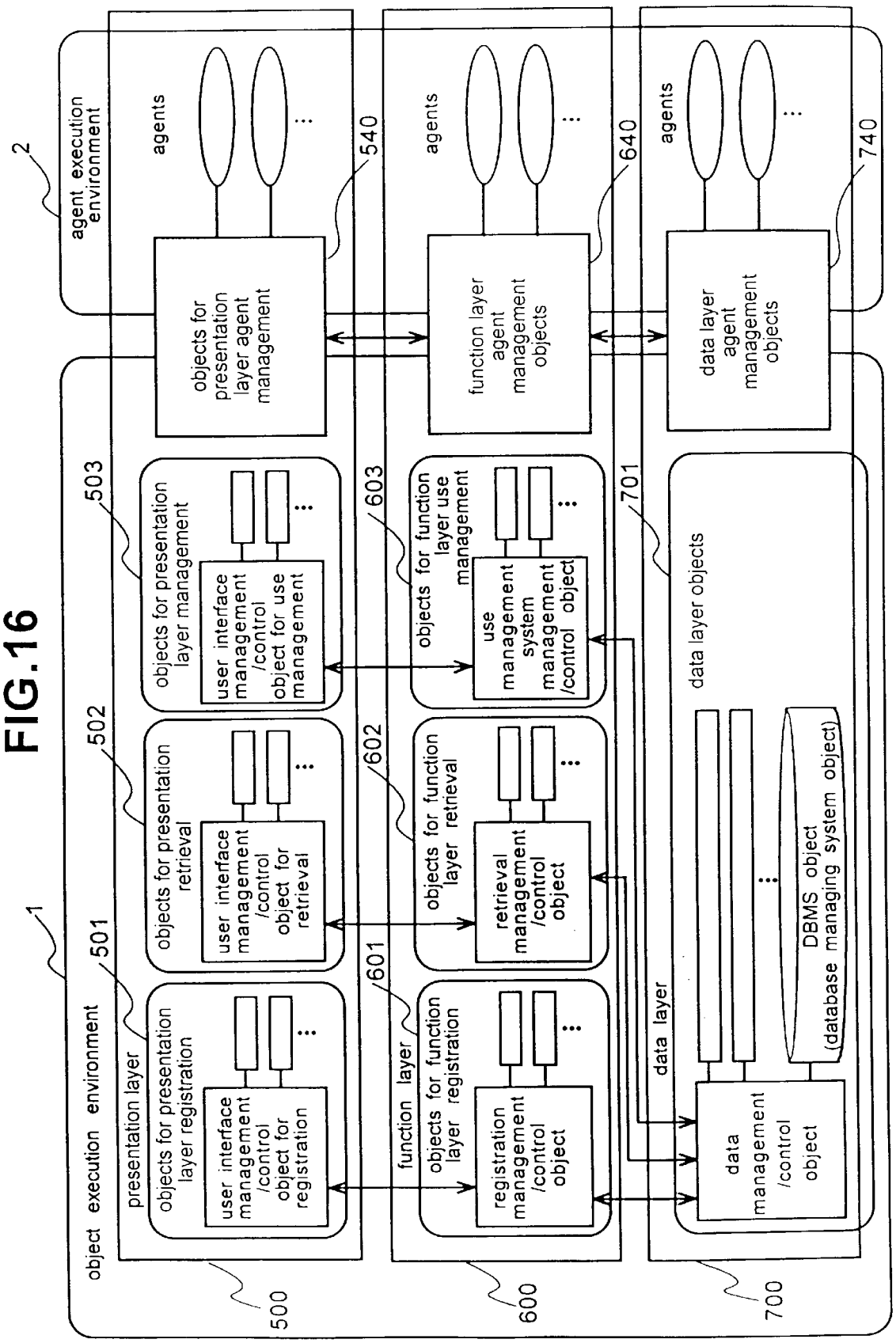
FIG. 16 is a diagram showing the configuration of a sixth embodiment of the invention.

FIG. 16 shows the configuration of a document management system according to an embodiment of the invention.

The document management system of this embodiment is constituted by an object execution environment 1 and an agent execution environment 2. The object and agent execution environments 1 and 2 are each constituted of three layers, including a presentation layer 500, a function layer 600, and a data layer 700. The presentation layer 500 provides a user interface function such as a display screen for document registration and a display screen for retrieval result. The function layer 600 provides a document registration function, a document retrieval function, and a retrieval result display function. The data layer 700 provides a database function.

In the object execution environment 1, the presentation layer 500 is constituted of objects 501 for presentation layer registration, objects 502 for presentation layer retrieval, objects 503 for presentation layer management, and objects 540 for presentation layer agent management. The function layer 600 is constituted of objects 601 for function layer registration, objects 602 for function layer retrieval, objects 603 for function layer use management, and objects 640 for function layer agent management. The data layer 700 is constituted of objects 701 for data layer and objects 740 for data layer agent management. Each object group is collectively managed and controlled by a management/control object provided for each layer. The document management system of this embodiment has the above configuration.

Of functions of the digital library system, the functions of document registration, retrieval, and inspection, and use management processes by a library manager will first be described. These functions are implemented as objects because the specifications and fabrication methods thereof are already established as the basic functions of the digital library system.

First, processes of registering a document will be described.

In the digital library system, document information of various formats is exchanged between a plurality of document management systems interconnected by a wide area network. The document information includes: structured documents such as electronic documents written by SGML (Standard Generalized Markup Language) with definite logical structures of documents; non-structured documents without definite logical structures; image data such as pictures; and other documents. In order to efficiently reuse documents, the logical (semantic) structure of a document as well as the contents (main text data) and the bibliographic items has an important role. Therefore, in the document management system of this embodiment, in order to ensure exchangeability of document data, all documents are converted at the function layer into the SGML format which is a standard format of structured documents. Thereafter, the documents to be registered are transmitted to the data layer and stored and managed in the database.

Figure 17:
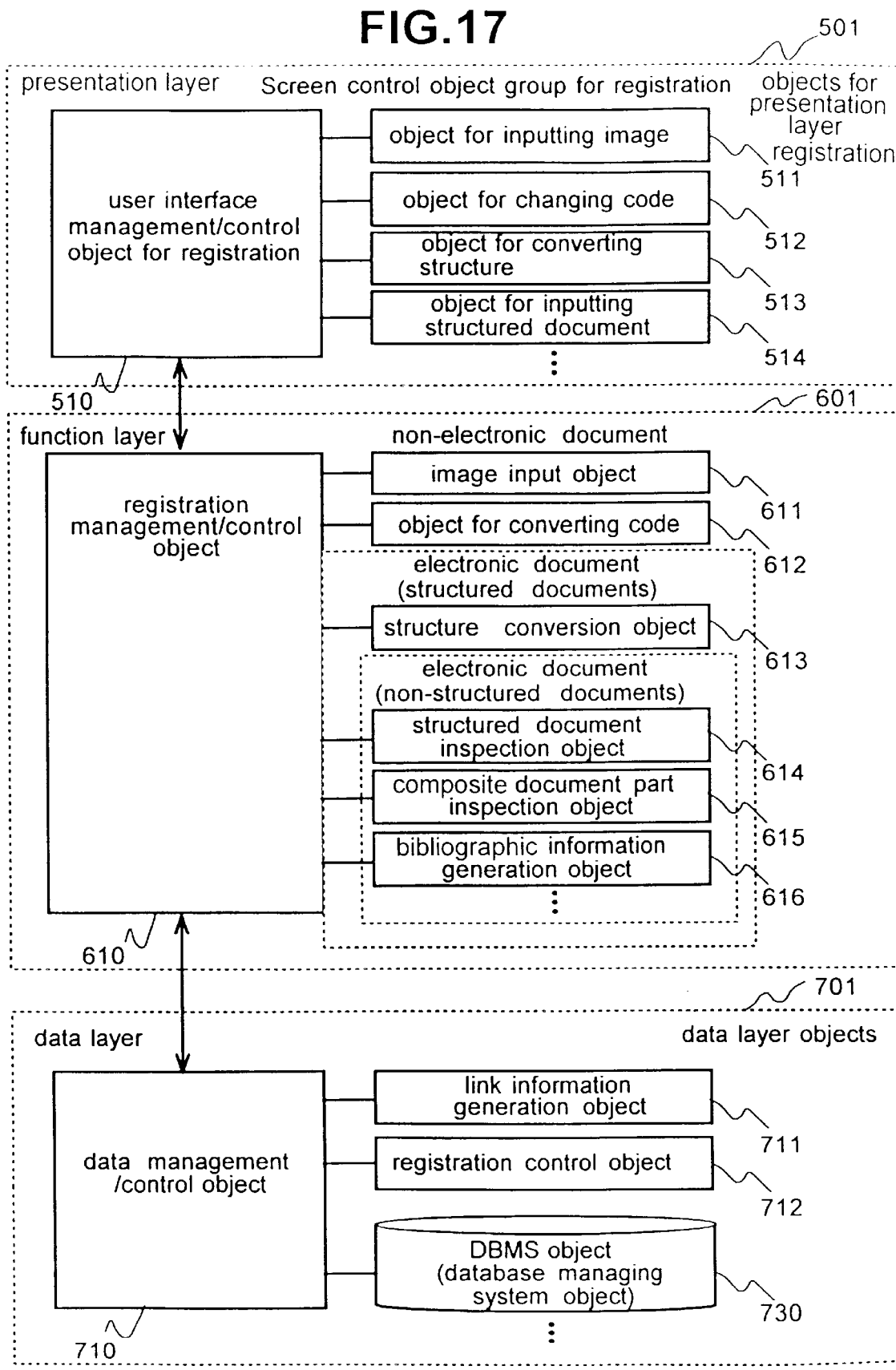
FIG. 17 is a diagram showing the configuration of input objects of the sixth embodiment of the invention.

FIG. 17 shows the configuration of document registration objects of this embodiment.

In the document management system of this embodiment, the presentation layer registration objects 501 include: an object 511 for inputting images; an object 512 for coding; an object 513 for converting a structure; an object 514 for inputting a structured document; a user interface management/control object 510 for registration using the above-mentioned objects; and other objects. The function layer registration objects 601 include: an image input object 611; a coding object 612; a structure conversion object 613; a structured document inspection objects 614, a composite document part inspection object 615; a bibliographic information generation object 616, and a user interface management/control object 610 for registration using the abovementioned objects; and other objects.

The data layer objects 701 include: a link information generation object 711, a registration control object 712, a database management system (DBMS) object 730 for storing and managing documents; a data management/control object 710 for management and control of the abovementioned objects; and other objects.

Next, the registration processes of the document management system of this embodiment will be described.

Figure 18:
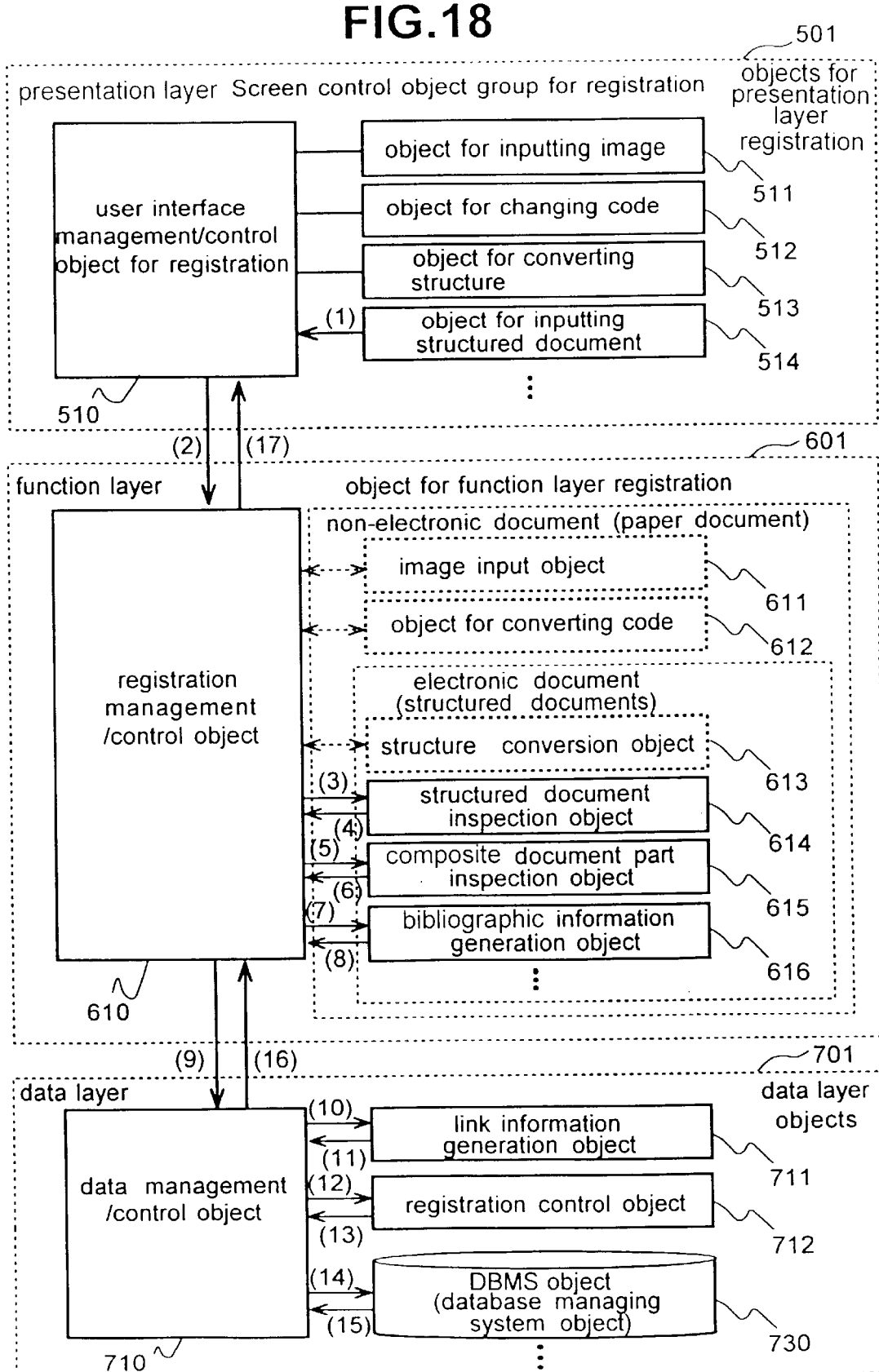
FIG. 18 is a diagram illustrating the procedure of registering a structured document according to the sixth embodiment of the invention.

First, the processes of registering an electronic document, particularly, a structured document such as written with SGML having a definite logical document structure, will be described with reference to FIG. 18.

(1) In registering a document, a national book number of the document is acquired by using as a search key the title, author name, and the like of the document. The national book number is a number unanimously discriminating the document from other documents published in the nation. The structured document input object 514 instructs to register the document via the structured document input user interface, by designating the national book number, a storage region name, a document title, and a DTD (Document Type Definition) name.

(2) An instruction message for structured document registration is transmitted via the registration user interface management/control object 510 to the registration management/control object 610.

(3) The registration management/control object 610 transmits an inspection execution message to the structured document inspection object 614. The inspection execution message is used for inspecting the storage region name, title, and DTD name of the document to be registered, and for inspecting whether the document is a correct structured document.

(4) The structured document inspection object 614 performs a purging process for the designated SGML document to inspect whether the document has no contradictory logical structure, and the inspected result is sent back to the registration management/control object 610. The purging process is described, for example, in "Practical SGML" by Eric van Herwijnen, Japan Standards Association, 1992, p. 127–p. 133. If it is judged that the logical structure is contradictory, the registration management/control object 610 notifies the client of this fact and urges the client to correct it.

(5) If the structured document inspection process judges that there is no contradictory logical structure in the document, the registration management/control object 610 transmits to the composite document part inspection object 615 an execution message together with the storage region name, title, and DTD name of the document.

(6) The composite document part inspection object 615 inspects whether there is sufficient element data constituting the designated SGML document, and the inspected result is sent back to the registration management/control object 610. If the inspection judges that the element data in the document is insufficient, the registration management/control object 610 notifies the client of this fact to urge correct it.

(7) If the composite document inspection process judges that the document contains all the element data or parts, the registration management/control object 610 transmits to the bibliographic information generation object 616 an execution message together with the national book number of the structured document to be registered.

(8) The bibliographic information generation object 616 acquires bibliographic information by using as a search key the national book number of the designated document. The bibliographic information is being stored in the format of, for example, JAPAN/MARC used by the National Diet Library. This bibliographic information is converted into the SGML format in accordance with standard bibliographic DTD for use with digital libraries, to generate a bibliographic SGML statement which is sent back to the registration management/control object 610. If the bibliographic SGML statement generation process does not terminate normally, the registration management/control object 610 notifies the client of this fact to urge to correct the entered bibliographic information.

(9) The SGML document and the bibliographic SGML statement generated by the above processes are transferred to the data layer and a registration message is transmitted to instruct the data layer 701 to register them.

(10) Upon reception of the registration message from the function layer registration management/control object 610, the data management/control object 710 in the data layer 701 transmits to the link information generation object 711 an execution message together with the storage region name, title, and DTD name of the structured document.

(11) The ling information generation object 711 analyzes the SGML document in accordance with its DTD to derive a reference portion of an external document (or part). Off-set information of the SGML document relative to the reference portion and an identification number of the referenced external document (or part) are derived to generate link information which is sent to the data management/control object 710.

(12) After the link information generation object 711 generates the link information of the SGML document to be registered, the data management/control object 710 transmits to the registration control object 712 an activation message together with the SGML document, bibliographic SGML statement, link information, and national book number.

(13) The registration control object 712 analyzes the registration request in detail, and generates a registration message train for the DBMS object 730. The registration message train is constituted, for example, of SQL insert statements if the DBMS object is a relational database RDB object. The registration message train is sent back to the data management/control object 710.

(14) The data management/control object 710 transmits the registration message train (e.g., SQL insert statements) to the DBMS object 730.

(15) Upon reception of the registration message from the data management/control object 710, the DBMS object 730 sets up its registration method to execute the registration process. The data management/control object 710 receives an argument of the registration method from the DBMS object 730 to thereby confirm that the registration by the DBMS object 730 has been completed normally. If registration by the DBMS object 730 is not completed normally, the data management/control object 710 issues a roll-back request to the DBMS object 730 to recover the original state of the database.

(16) The data management/control object 710 judges whether all the registration by the DBMS object 730 has been completed normally. If completed normally, a notice to this effect is sent back to the function layer registration management/control object 610.

(17) The registration management/control object 610 judges from an argument of the registration message sent to the data layer 701 whether the document registration has been completed normally. If it is judged that the registration has been completed normally, a notice to this effect is sent to the presentation layer to terminate the registration. If not, the registration management/control object 610 urges the client to again send a registration message to the data layer or a notice of registration failure is sent back to the presentation layer to terminate the registration.

The above processes are the contents of registration of an electronic document, particularly, a structured document written in a standard structured document format such as SGML having a definite logical document structure.

Next, the processes of registering an electronic document whose logical structure is not described definitely (hereinafter called a non-structured document) will be described.

Figure 19:
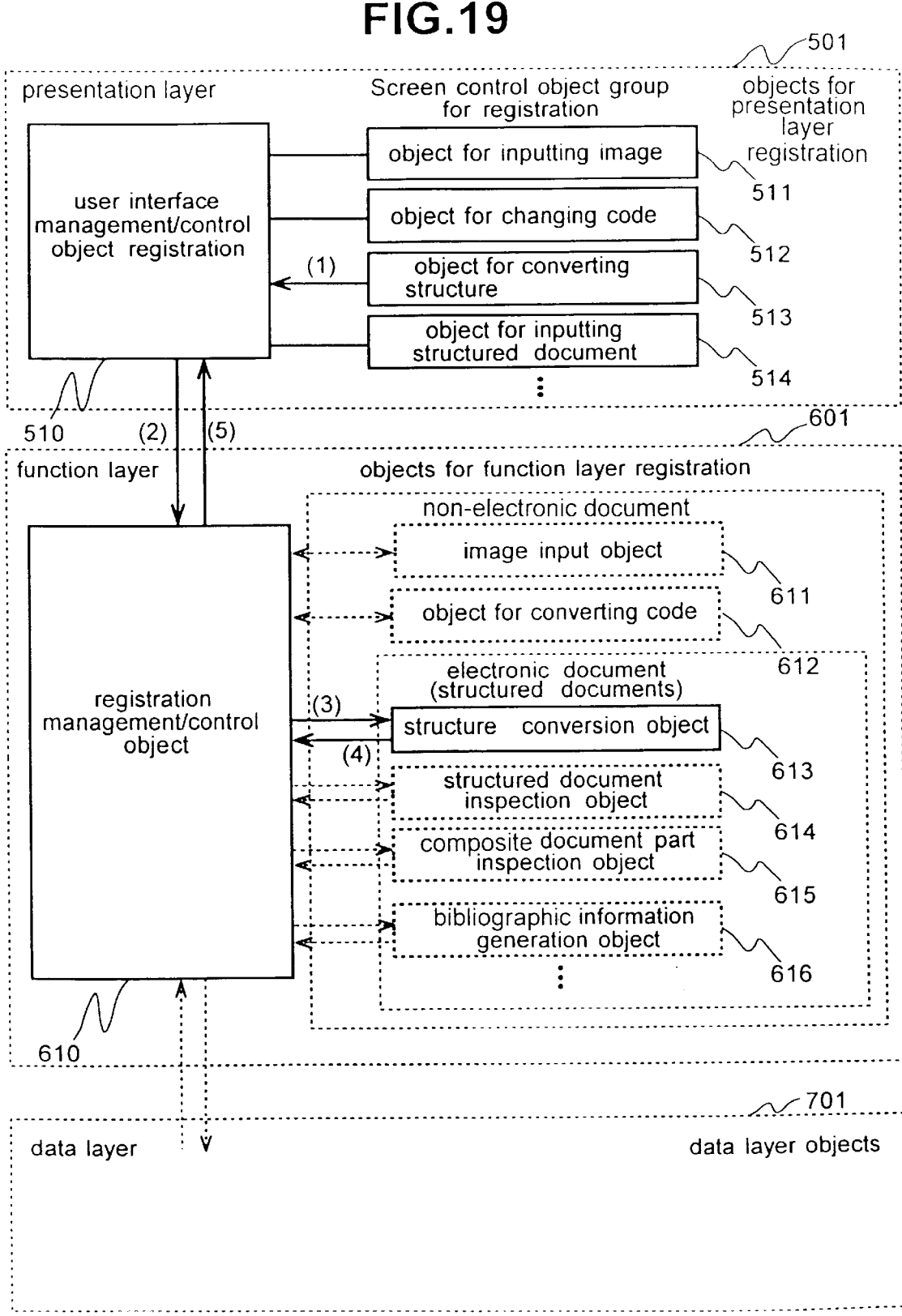
FIG. 19 is a diagram illustrating the procedure of registering a non-structured document according to the sixth embodiment of the invention.

A non-structured document can be registered by converting it into a structured document and thereafter executing the same process as the registration of a structured document. In the following, only the conversion process of a non-structured document into a structured document will be described with reference to FIG. 19.

(1) In registering a non-structured document, a national book number of the document is acquired by using as a search key the title, author name, and the like of the document. The structure conversion object 513, which controls user interface for converting a non-structured document into a structured document, instructs to register the document by designating the national book number, a storage region name, a document title, and a DTD name.

(2) An instruction message for registering a non-structured document is transmitted via the registration user interface management/control object 510 to the registration management/control object 610.

(3) The registration management/control object 610 transmits to the structure conversion object 613 an execution message together with the storage region name, title, DTD name, and a structured document conversion rule for converting a non-structured document into a structured document.

(4) The structure conversion object 613 converts the designated non-structured document into the SGML format. Specifically, if the designated document is a document having no logical structure or a document unnecessary for retrieval through designation of logical structure or unnecessary for display, the designated document is converted into one logical structure of an SGML document. Alternatively, if the designated document is a document having a logical structure or a document necessary for retrieval through designation of logical structure or necessary for display, the designated document is converted into an SGML document by performing a logical structure recognition process in accordance with the designated DTD and structured document conversion rule, for example, by using the method proposed in U.S. Ser. No. 08/697,782 (Japanese Patent Application No. 223017/1995). The generated SGML document is sent back to the registration management/control object 610.

(5) The registration management/control object 610 confirms basing upon an argument of the execution message from the structure conversion object 613 whether the process of converting into the structured document has been completed normally. If normally completed, a notice to this effect is sent to the presentation layer, whereas if not, the registration management/control object 610 urges the structure conversion object 613 to again send an execution message or a notice of structure conversion failure is sent back to the presentation layer to terminate the process.

The above processes are the contents of registration of a non-structured document.

Lastly, the processes of registering a non-electronic document such as a document printed on paper sheets will be described.

In registering a non-electronic document, a paper document is input by reading with an image scanner or the like, and its electronic image data is subjected to a character recognition process. In this case, the character information portion is either converted into a text or not subjected to the character recognition process. In the former case, five steps are executed, including an image input step, a coded text conversion step through character recognition, a structured document conversion step, a structured document generation step, and a structured document data layer registration step. In the latter case, four steps are executed, including an image input step, a structured document conversion step, a structured document generation step, and a structured document data layer registration step.

Figure 20:
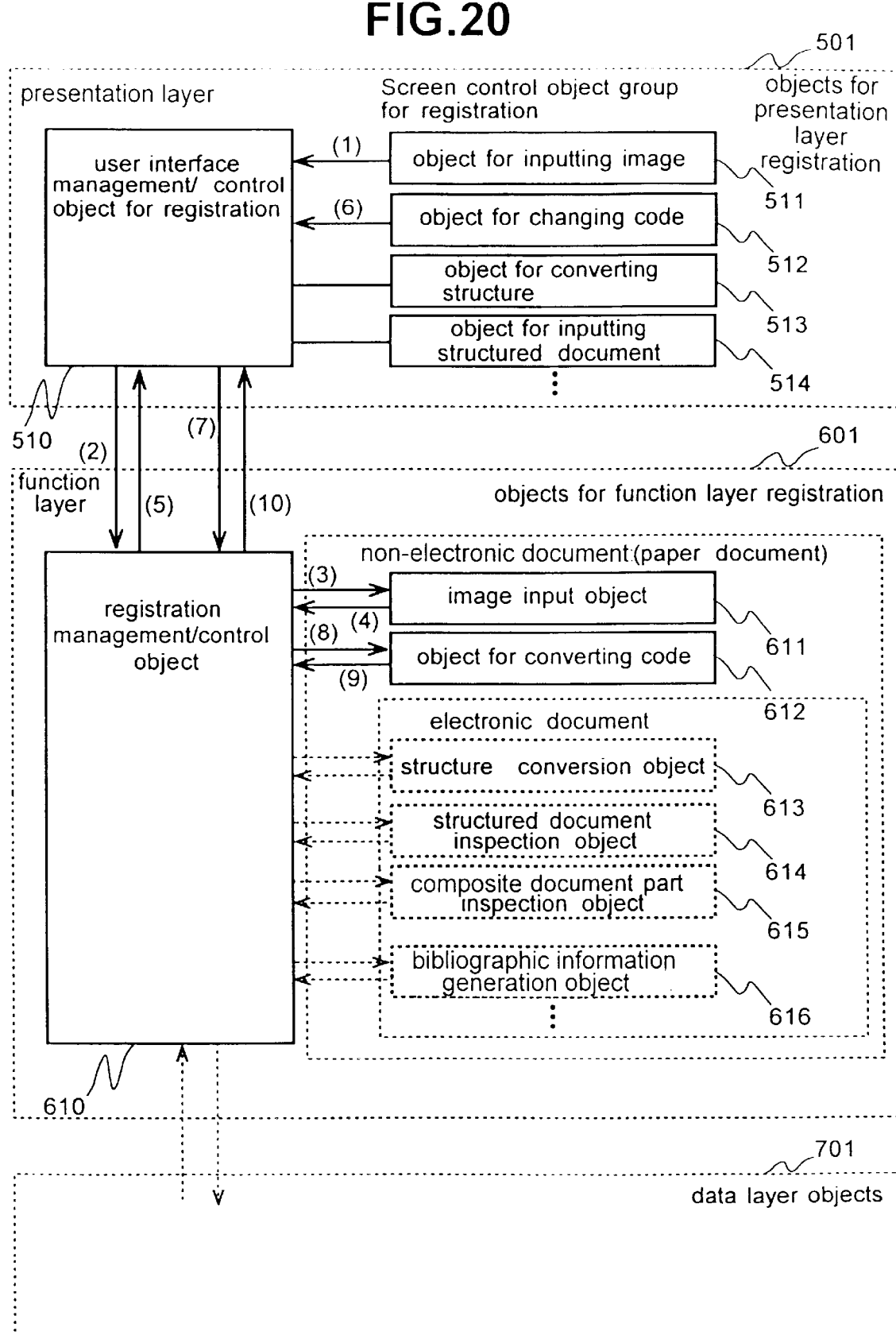
FIG. 20 is a diagram illustrating the procedure of registering a non-electronic document according to the sixth embodiment of the invention.

Of these steps, the structured document conversion step, structured document generation step, and structured document data layer registration step can be executed by the same processes as the previously described input processes of an electronic document. Therefore, only the image input process and the coded text conversion through character recognition, respectively at the function layer, will be described with reference to FIG. 20.

First, an image input process will be described.

(1) In registering a non-electronic document, a national book number of the document is acquired by using as a search key the title, author name, and the like of the document. The image input object 511, which controls image input user interface, instructs to register the document by designating the national book number of the document.

(2) An image input instruction message is transmitted via the registration user interface management/control object 510 to the registration management/control object 610.

(3) The registration management/control object 610 generates an image data storage directory having a name corresponding to the national book number. An execution message together with the name of the generated directory is transmitted to the image input object 611.

(4) The image input object 611 reads a paper document one page after another with a scanner, and stores the input image at the directory, by giving a file name corresponding to each page. If the paper document input process has been completed normally or abnormally, a notice to this effect is sent back to the registration management/control object 610 as an argument of the image input object 611.

(5) The registration management/control object 610 confirms, basing upon the argument of the execution message from the image input object 611, whether the image input has been completed normally. If normally completed, a notice to this effect is sent to the presentation layer. If not, the registration management/control object 610 urges the image input object 611 to again send an execution message or a notice of image input failure is sent back to the presentation layer to terminate the process. The above is the contents of image input processes.

Next, an image coding process will be described.

(6) In coding the image data, a national book number of the document is acquired by using as a search key the title, author name, and the like of the document. The coding object 512 which controls image input user interface instructs to register the document by designating the national book number of the document.

(7) An image input instruction message is transmitted via the registration user interface management/control object 510 to the registration management/control object 610.

(8) The registration management/control object 610 transmits a coding execution message together with the national book number of the document to the coding object 612.

(9) The coding object 612 derives the name of the directory at which the image data is stored, by using the national book number of the document, and reads the image data in the order of page number. The type of each image data is analyzed to derive a character portion which is subjected to a character recognition process to encode the image data into text data. After the coding is normally completed, the coded data is returned back to the registration management/control object. If not completed normally, a notice to this effect is transmitted to the registration management/control object 610.

(10) The registration management/control object 610 confirms, basing upon the argument of the execution message from the coding object 612, whether the document registration has been completed normally. If normally completed, a notice to this effect is sent to the presentation layer. If not, the registration management/control object 610 urges the coding input object 612 to again send an execution message or a notice of coding failure is sent back to the presentation layer to terminate the process. The above is the contents of image data coding processes.

As above, in the document management system of this embodiment using digital libraries by way of example, all documents are converted into structured documents such as SGML at the function layer, and thereafter stored in the data layer. It is therefore possible to collectively store and manage data such as image data and text data. Since all documents processed at the data layer use the standard format, data exchange between libraries interconnected by a wide area network can be easily realized.

Figure 21:
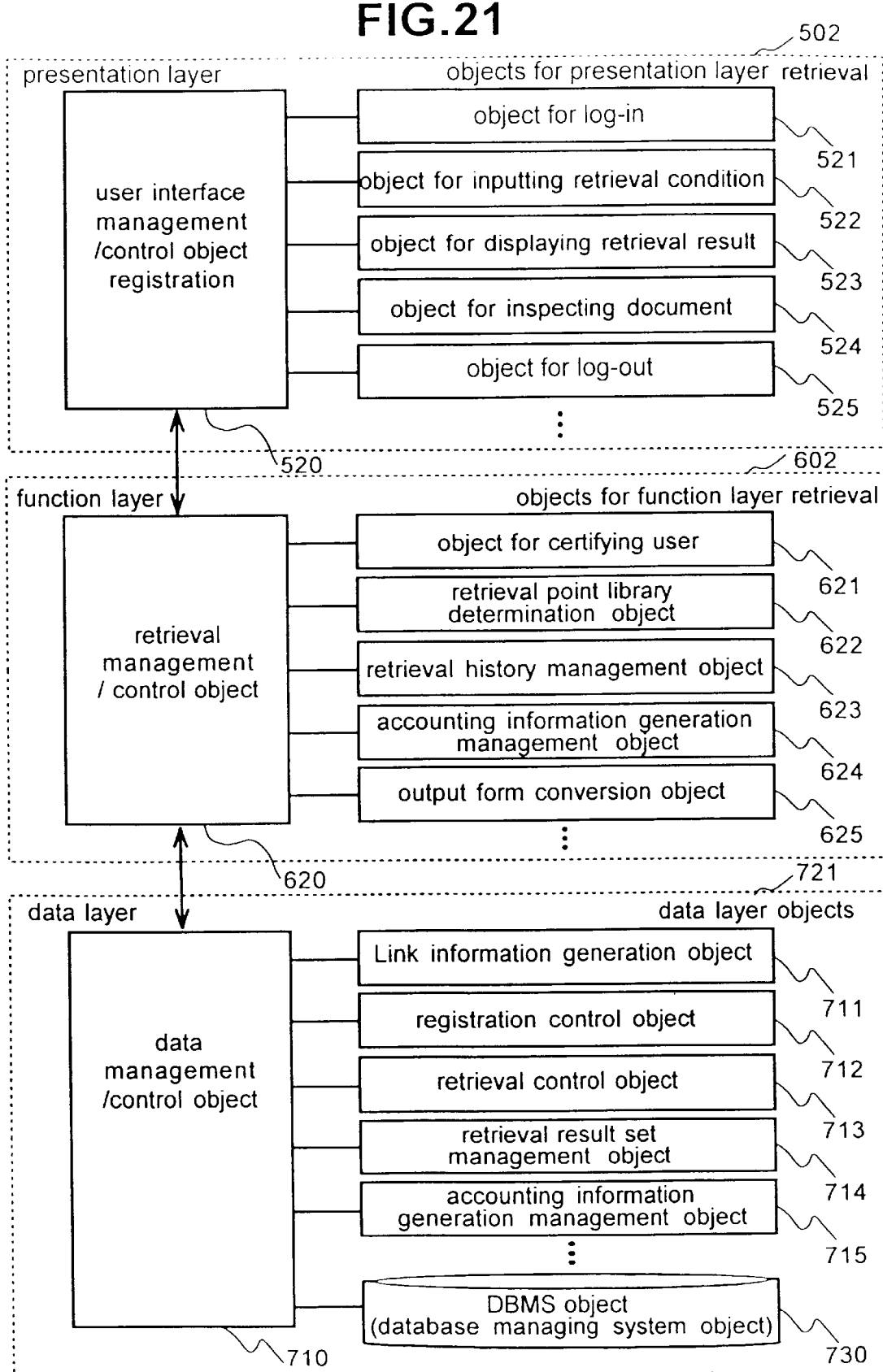
FIG. 21 is a diagram showing the configuration of retrieval/inspection objects of the sixth embodiment of the invention.

Next, the configuration of retrieval and inspection processes in the document management system of this embodiment will be briefly described with reference to FIG. 21.

In the document management system of this embodiment, presentation layer retrieval objects 502 shown in FIG. 16 include: an object 521 for log-in; an object 522 for inputting retrieval condition; an object 523 for displaying retrieval result; an object 524 for inspecting a document; an object 525 for log-out; a retrieval user interface management/control object 520 for managing and controlling the above objects; and other objects. Function layer retrieval objects 602 include: an object 621 for certifying a user; a retrieval point library determination object 622; a retrieval history management object 623; an accounting information generation management object 624; an output form conversion object 625; a retrieval management/control object 620 for managing and controlling the above objects; and other objects. Data layer objects 721 include: in addition to the objects of the data layer objects 701 shown in FIG. 17, a retrieval control object 713; a retrieval result set management object; and an accounting information generation management object 715.

Next, the retrieval and inspection processes of this embodiment will be described briefly.

As a user accesses the document management system via the Internet by using, for example, a WWW (World Wide Web) browser, a log-in screen is first displayed. Log-in is an operation for certifying a user accessing the document management system. If a user entering an assigned user ID and an assigned password is certified, the user can access the document management system. Such log-in is required for charging the user with an access fee of document information, for limiting an access to particular document information, and for other purposes. If charging the user, access limit, and the like are not necessary, log-in operation is not necessary.

Once log-in is established, a retrieval condition input screen is displayed. The user enters the retrieval condition from the retrieval condition input screen, to perform bibliographic retrieval by designating bibliographic information such as a title and an author name as the retrieval condition or to perform full text retrieval by designating a keyword as the retrieval condition. A list of retrieval result documents is therefore acquired. If the contents of any document among them is to be inspected, the user designates the document. In the document management system of this embodiment, past retrieval history and a past retrieval result set are registered. Therefore, reference to the past retrieval result, narrow-range retrieval of an intermediate retrieval result set, and the like can be performed.

After retrieval and inspection of documents are repeated in the above manner, the user designates a log-out process from a log-out screen to terminate a series of retrieval and inspection processes. The above is the outline of the processes of the document management system of this embodiment.

In the following, the processes of log-in, retrieval, inspection, and log-out of the document management system of this embodiment will be described.

Figure 22:
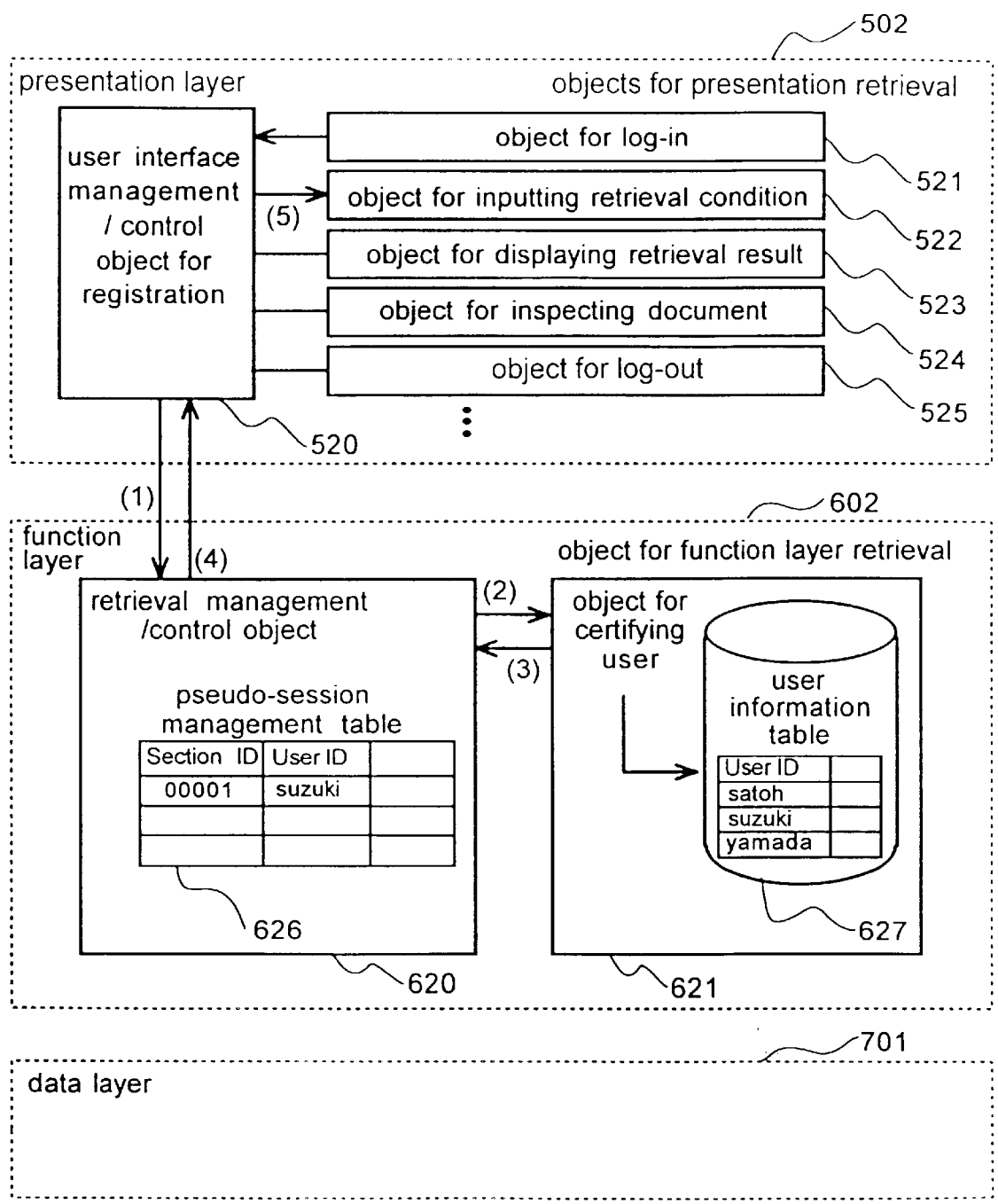
FIG. 22 is a diagram illustrating the procedure of a log-in process of the sixth embodiment of the invention.

First, the contents of the log-in process will be described with reference to FIG. 22.

(1) As a user accesses a digital library system, the retrieval user interface management/control object 520 first activates the log-in object 521 which displays a log-in screen. A user ID and a password assigned to each library user are entered from this log-in screen which is constituted of a transmission button and a text area for inputting a user ID and a password. As the transmission button is clicked with a mouse, a log-in message is issued from the retrieval user interface management/control object 520 to the retrieval management/control object 620.

(2) The retrieval management/control object 620 received the log-in message analyzes the log-in message, and if it is confirmed to be a log-in message, the message is transferred to the user certifying object 621.

(3) The user certifying object 621 received the log-in message checks whether the user ID and password contained in the message are being registered in a user information table 627. The checked result of whether the user can be certified or not is notified to the retrieval management/control object 620.

(4) If the user cannot be certified, the retrieval management/control object 620 responded by the user certifying object 621 sends a notice to this effect to the retrieval user interface management/control object 520 to urge the user to enter again the user ID and password.

If the user can be certified, a pseudo-session management function (not shown) of the retrieval management/control object 620 is used to establish a pseudo-session virtually realizing a physical session of a conventional client/server system. The pseudo-session manages a series of processes from an entrance (log-in) to a digital library to an exit (log-out which is later detailed), by using one identifier (pseudo-session ID), and stores the retrieval result in association with the identifier, so that later narrow-range retrieval from an intermediate retrieval result set, or other operations can be realized. The pseudo-session management function assigns a log-in user a pseudo-session ID specific to the library, and stores it together with the user ID in a pseudo-session management table 626. After the pseudo-session is established in the above manner, a reply is sent back to the retrieval user interface management/control object 520 to urge it to display the next screen.

(5) The retrieval user interface management/control object 520 activates the retrieval condition input M7 object 522 to display a retrieval condition input screen. The above is the contents of the log-in process.

Figure 23:
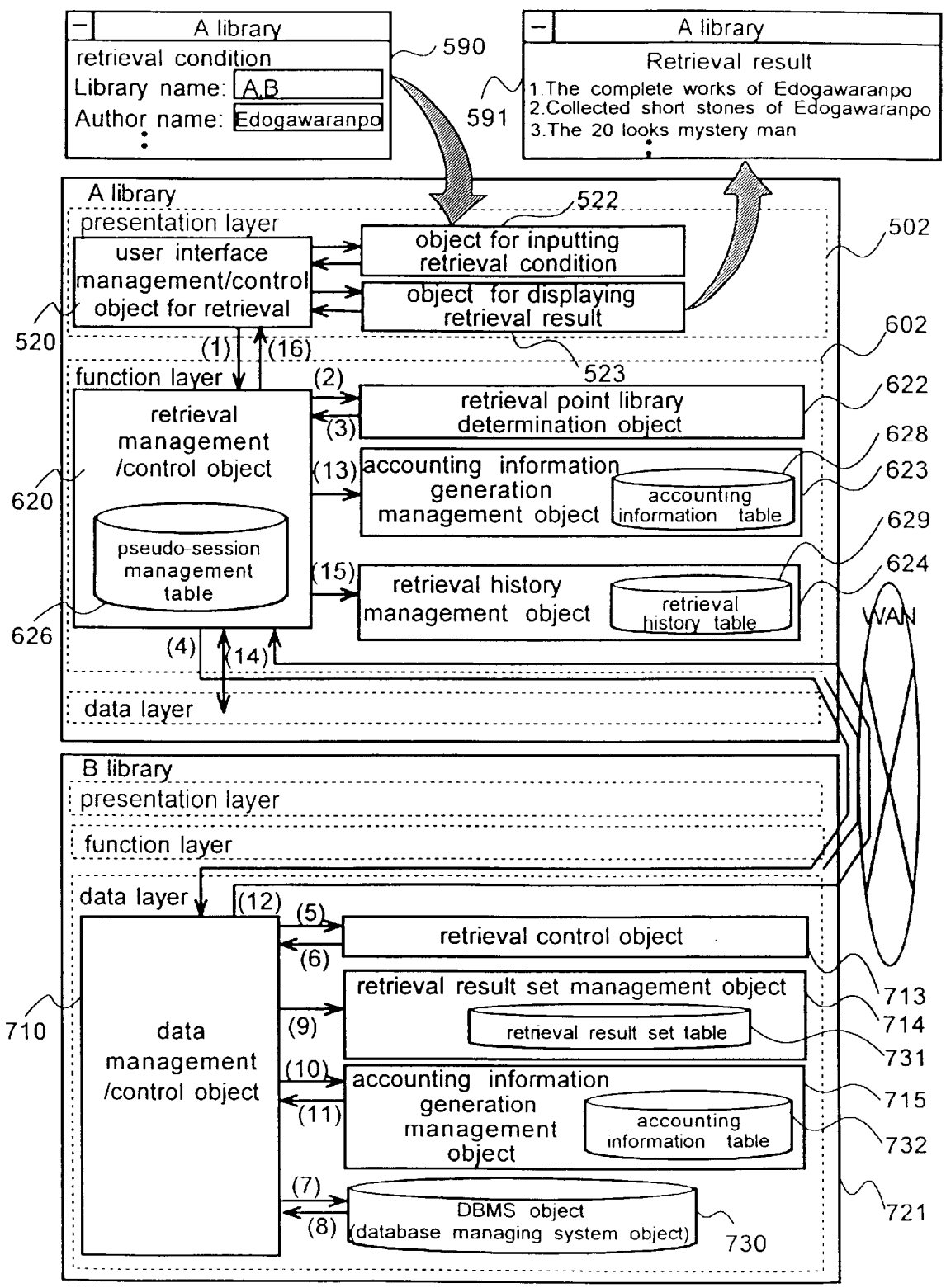
FIG. 23 is a diagram illustrating the procedure of a retrieval process of the sixth embodiment of the invention.

Next, the contents of a retrieval process will be described with reference to FIG. 23.

(1) A user enters a retrieval condition from a retrieval condition input screen 590 under control of the retrieval condition input object 522. The retrieval condition may be bibliographic retrieval for bibliographic information such as a title and an author name, full text retrieval for a full text containing a keyword, or browsing retrieval using hierarchical document classification. If a library from which documents are retrieved is designated, documents other than those in the accessed library can be retrieved. In his example, it is assumed that a user enters a library and retrieves documents from "library A and library B" under the retrieval condition of an author name of "Edogawaranpo". As the retrieval condition is entered, a retrieval instruction message is transmitted via the retrieval user interface management/control object 520 to the retrieval management/control object 620.

(2) In the retrieval management/control object 620 received the retrieval instruction message, the pseudo-session management function determines a pseudo-session ID. Thereafter, the retrieval management/control object 620 analyzes the received message, and if it is judged that the received message is a retrieval instruction message, transmits it to the retrieval point library determination object 622.

(3) If there are a plurality of retrieval libraries designated by the user, the retrieval point library determination object 622 determines one of them in accordance with a rule pre-defining the order of retrieval. As an example of this rule, retrieval is performed starting from a library having documents more than other libraries because in the retrieval by bibliographic information a particular document can be found with a higher possibility from the library having more documents. The retrieval point library determination object 622 sends the determined retrieval order to the retrieval management/control object 620. In this example, it is assumed that the retrieval order of "library B→library A" is sent back.

(4) In accordance with the retrieval order, the retrieval management/control object 620 received this order issues a retrieval instruction message to the data layer 721 of the determined library. In this example, the retrieval instruction message is issued to the data management/control object 710 of the library B.

(5) The data management/control object 710 at the library received the retrieval instruction message analyzes the message, and if it is judged as a retrieval instruction message, sends it to the retrieval control object 713.

(6) The retrieval control object 713 analyzes the retrieval instruction message, converts it into a instruction message train to be directed to the DBMS object, and sends it to the data management/control object 710.

(7) The data management/control object 710 received the instruction message train to be directed to the DBMS object 730 issues an instruction message to the DBMS object 730 from which documents are retrieved.

(8) In accordance with the received instruction message, the DBMS object 730 retrieves documents by using an access privilege management method which checks whether the user is allowed to refer to the retrieved document. The DBMS object 730 sends the retrieval result and the retrieval result set identifier to the data management/control object 710. The retrieval result includes: an identifier used for reading document data during document inspection; the number of documents satisfying the retrieval condition; bibliographic information such as titles and author names; and the like.

(9) The data management/control object 710 received the retrieval result and retrieval result set identifier sends the retrieval result set identifier and a retrieval result set identifier registration instruction message to the retrieval result set management object 714. This message contains the pseudo-session ID added to the retrieval instruction message supplied from the retrieval management/control object 620. The retrieval result set management object 714 stores a combination of the pseudo-session ID and retrieval result set identifier in a retrieval result set table 731.

(10) The data management/control object 710 further sends an accounting information generation instruction message to the accounting information generation management object 715.

(11) The accounting information generation management object 715 generates accounting information from the contents of retrieval processes, manages this information in an accounting information table 732 at the data layer, and sends the generated accounting information to the data management/control object 710.

(12) The data management/control object 710 received the accounting information sends the retrieval result, retrieval result set identifier, and accounting information to the retrieval management/control object 620.

(13) The retrieval management/control object 620 received the retrieval result and the like sends an accounting information addition instruction message to the accounting information generation management object 623. The accounting information generation management object 623 received the accounting addition instruction message adds the accounting information supplied from the retrieval management/control object 620 to the accounting information at the pseudo-session.

(14) The retrieval management/control object 220 repeats transmission of the retrieval instruction message to other libraries, in accordance with the retrieval order.

(15) After retrieval from all libraries, the retrieval management/control object 620 issues a retrieval history registration instruction message to the retrieval history management object 624. The retrieval history management object 624 received the retrieval history registration instruction message registers the retrieval instruction message supplied from the presentation layer and a pair of the retrieval result set identifier and the retrieval library in a retrieval history table 629. The retrieval history is information which is supplied to the presentation layer as display data in order to provide a user with retrieval services for the past retrieval result set.

(16) The retrieval management/control object 620 sends the retrieval result to the retrieval user interface management/control object 520. The retrieval user interface management/control object 520 received the retrieval result instructs the retrieval result display object 523 to display a retrieval result screen.

The retrieval result screen displays a list of bibliographic information such as titles and author names of the documents satisfying the retrieval condition. A portion (e.g., a title) of the displayed bibliographic information is used as a button (anchor) for hyperlink. If this button is clicked with a mouse, the contents of that document can be inspected. During document inspection, information for identifying the document selected for realizing hyperlink (the information including a library name having this document and an identifier used for reading document data received as the retrieval result) is buried in the information displayed on the retrieval result screen.

Figure 24:
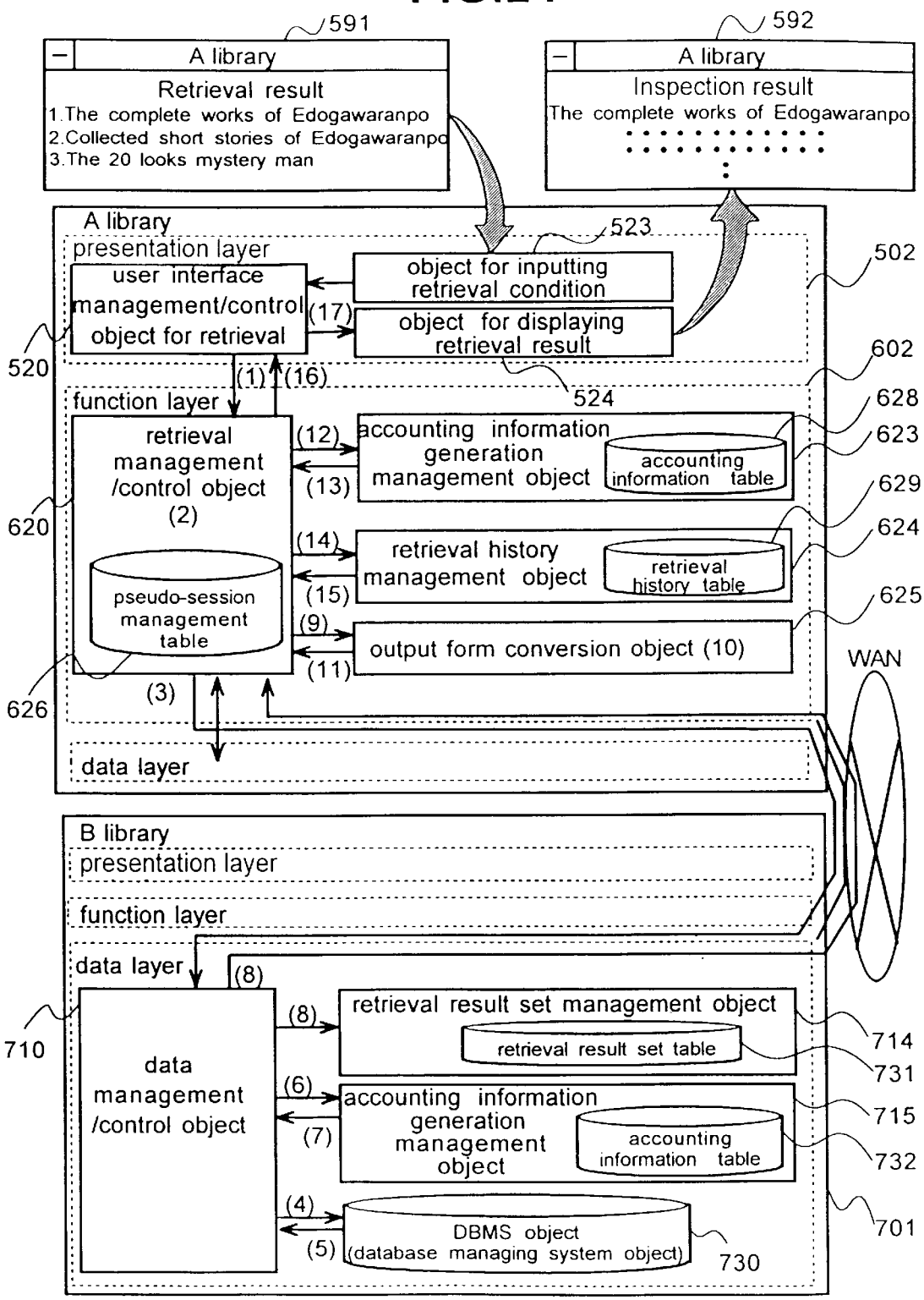
FIG. 24 is a diagram illustrating the procedure of an inspection process of the sixth embodiment of the invention.

The above is the contents of the retrieval process. Next, the contents of an inspection process will be described with reference to FIG. 24.

(1) As a user clicks with a mouse a document anchor buried in a document title or the like and displayed on a retrieval result screen 591, a document inspection instruction message generation unit (not shown) of the retrieval user interface management/control object 520 is activated. The document inspection instruction message generation unit receives an identifier of the user selected document from an HTML tag of the document, and in accordance with this identifier, generates an inspection instruction message for inspecting the document and sends it to the function layer retrieval management/control object 620. This identifier is generated by deriving the library name buried in the retrieval result screen as the retrieval result and by information for reading the contents of the document.

(2) A pseudo-session management unit (not shown) of the retrieval management/control object 620 received the inspection instruction message from the retrieval user interface management/control object 520 retrieves the pseudo-session ID from a pseudo-session management table 626 by using the user ID or the like as a search key.

(3) The retrieval management/control object 620 analyzes the received message, and if it is judged as an inspection instruction message, sends it to the data management/control object 710 of the library having the document (in this example, library B).

(4) The data management/control object 710 analyzes the received message, and if it is judged as an inspection instruction message, converts it into an instruction message train and issues it to the DBMS object 730, for acquiring link information and library element data such as the contents (SGML document) and image data of the document.

(5) In accordance with the instruction message train, the DBMS object 730 executes a reference method to refer to the contents of the document. The reference method retrieves from the database the contents (SGML document) of the selected document, element data such as images constituting the document, and information representative of links between element data, and sends the retrieved data to the data management/control object 710.

(6) The data management/control object 710 received the document contents from the DBMS object 730 generates an instruction message for generating accounting information and sends it to the accounting information generation management object 725.

(7) The accounting information generation management object 715 generates accounting information in accordance with the type of the accessed database and the number of hit documents, manages it in a data layer accounting information table 732, and sends it to the data management/control object 710.

(8) The data management/control object 710 received the accounting information sends to the retrieval management/control object 620 the contents (SGML document) of the document, element data, and link information respectively received from the DBMS object 730, and the accounting information received from the accounting information generation management object 715.

(9) The retrieval management/control object 620 received the contents (SGML document) of the document, element data, link information, and accounting information generates an instruction message for generating an HTML (Hyper Text Markup Language) and sends it to the output form conversion object 625.

(10) The contents of the document are converted from the SGML format into the HTML format in accordance with a conversion rule predetermined when user interface is determined, in order to convert SGML tags possessed by a digital library into HTML tags.

(11) Link information of document element data such as image data and hyperlink information are buried in the document converted into the HTML format.

The link information of element data is constituted of an identifier (hereinafter called an external identifier) already buried in the document for identifying a link destination document and the file name of element data. The external identifier is searched from the document converted into the HTML format, and is changed to the file name of element data supplied from the data management/control object 710.

The hyperlink information is constituted of the external identifier already buried in the document and an identifier for identifying the link destination document (e.g., a national code and a national book number of JAPAN/MARC used by the National Diet Library). The external identifier is searched from the document converted into the HTML format, and the document identified by the external identifier is searched to obtain the link destination document which is converted into the HTML format for display.

The HTML document generated in the above manner is sent to the retrieval management/control object 620.

(12) An instruction message is generated for adding the accounting information supplied from the data management/control object 710 to the accounting information managed at the function layer, and sent to the accounting information generation management object 622.

(13) The accounting information generation management object 622 received the accounting information addition instruction message adds the accounting message contained in the message to update an accounting information table 628 at the function layer.

(14) After the above processes are completed, the retrieval management/control object 620 generates an instruction message for retrieval history registration and transmits it to the retrieval history management object 623.

(15) The retrieval history management object 623 received the retrieval history registration instruction message registers the inspection instruction message supplied from the presentation layer into a retrieval history table 629.

(16) The retrieval management/control object 620 supplies the display HTML document generated at the process (11) to the retrieval user interface management/control object 520.

(17) The retrieval user interface management/control object 520 activates the document inspection object 524 to display, as an inspection result 592, the display HTML document received from the retrieval management/control object 620. If all data of the document is displayed at the client side, a long data transfer time is required because the data size is large. Therefore, the document inspection object 524 transfers the document, one image page after another and one proper text size after another so that the client can inspect the document by sequentially turning pages. The above is the contents of the inspection process.

Figure 25:
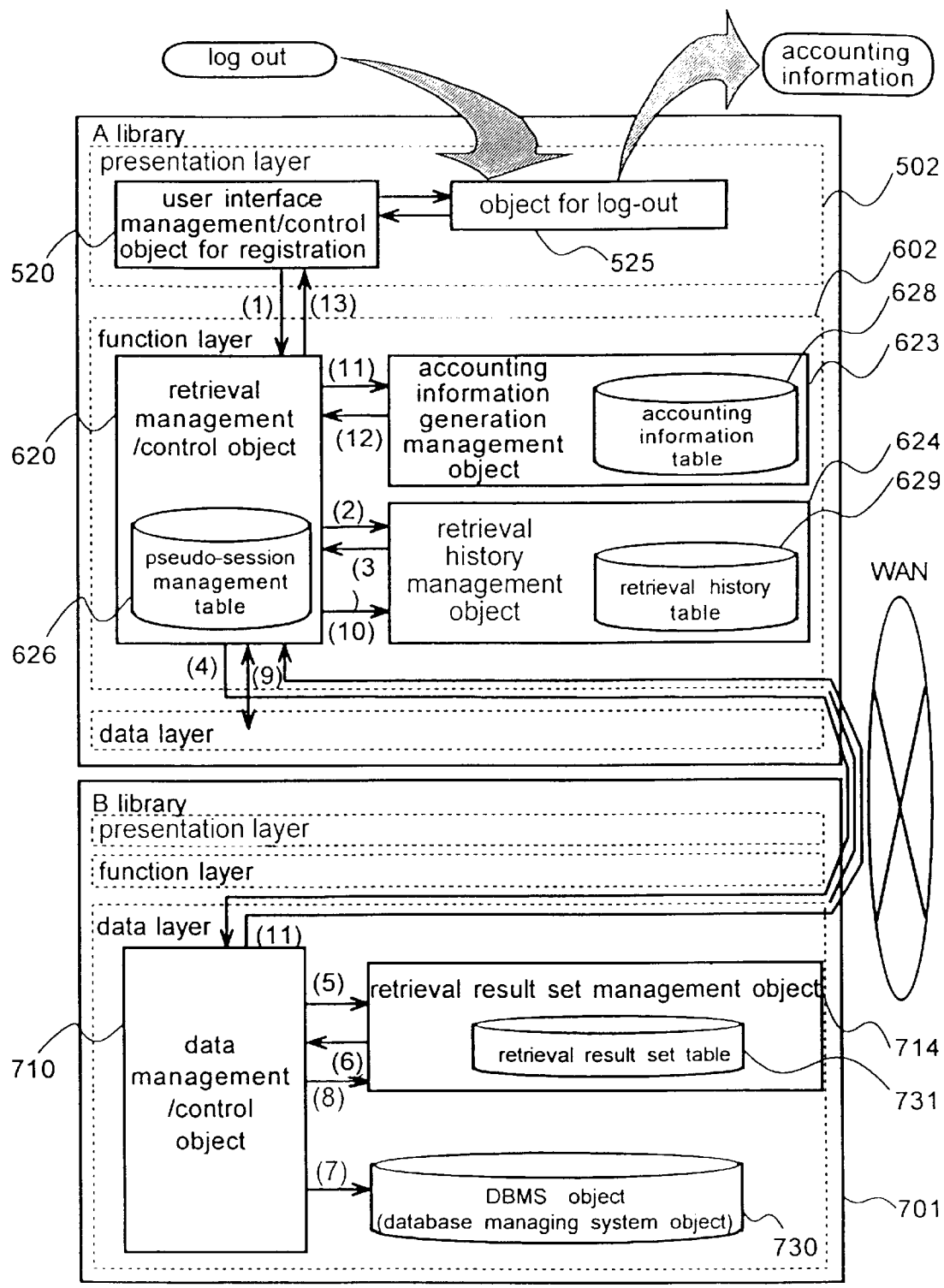
FIG. 25 is a diagram illustrating the procedure of a log-out process of the sixth embodiment of the invention.

Lastly, the contents of the log-out process will be described with reference to FIG. 25.

(1) A log-out message entered from the log-out screen under control of the log-out object 525 is transmitted via the retrieval user interface management/control object 520 to the retrieval management/control object 620.

(2) The pseudo-session management function of the retrieval management/control object 620 received the log-out message identifies the pseudo-session ID. Thereafter, the received message is analyzed, and if it is judged as a log-out message, the message is transferred to the retrieval history management object 623.

(3) The retrieval history management object 623 retrieves the corresponding retrieval history information set from the retrieval history table 629 by using the pseudo-session ID received from the retrieval management/control object 620 as a search key. The retrieval history information set is used for identifying and deleting the retrieval result set managed for the user and retrieval result set management information. The retrieval history management object 624 sends the obtained retrieval history information set to the retrieval management/control object 620. In this example, it is assumed that retrieval has been performed with respect to the pseudo-session once for each of libraries A and B in this order.

(4) The retrieval management/control object 620 received the retrieval history information set issues a log-out message to the data layer of each library, in accordance with the retrieval history information. In this example, the log-out message is issued first to the data management/control object 710 of library B.

(5) The data management/control object 710 received the log-out message at library B analyzes the message, and if it is a log-out message, transfers it to the retrieval result set management object 714.

(6) The retrieval result set management object 714 analyzes the log-out message, and retrieves the corresponding retrieval result set identifier from a retrieval result set table 731 by using the pseudo-session ID contained in the log-out message as a search key. In accordance with the retrieved retrieval result set identifier, the retrieval result set management object 714 generates an instruction message train to be directed to the DBMS object 730 for deleting the retrieval result set information managed for the user, and sends it to the data management/control object 710.

(7) The data management/control object 710 received the instruction message set to be directed to the DBMS object 730 issues it to the DBMS object.

The DBMS object 730 received the instruction message deletes the retrieval result set information in the database corresponding to the retrieval result set identifier contained in the instruction message.

(8) After the retrieval result set is completely deleted, the data management/control object 710 transmits a retrieval result set management information deletion instruction message to the retrieval result management object 714.

The retrieval result set management object 714 received the retrieval result set management information deletion instruction message deletes the corresponding retrieval result set management information from the retrieval result set table 731.

(9) The retrieval management/control object repeats to transmit the log-out message to each library in accordance with the retrieval history information.

(10) After all the log-out messages are transmitted in accordance with the retrieval history information, the retrieval management/control object 620 transmits a retrieval history information deletion instruction message to the retrieval history management object 624. The retrieval history management object 624 received the retrieval history information deletion instruction message deletes the corresponding retrieval history information from the retrieval history table 629.

(11) The retrieval management/control object 620 issues an accounting information calculation instruction message to the accounting information generation management object 623 at the function layer.

(12) The accounting information generation management object 623 received the accounting information calculation instruction message calculates accounting information for the pseudo-session and sends the calculated result to the retrieval management/control object 620.

(13) The retrieval management/control object 620 deletes the information of the corresponding pseudo-session from the pseudo-session management table 626, and thereafter sends the accounting information for the pseudo-session to the retrieval user interface management/control object 520. The retrieval user interface management/control object 520 displays the accounting information for a series of processes of the pseudo-session. The processes at the digital library system for this pseudo-session are completed in the above manner. The above description is the contents of the retrieval and inspection processes of the embodiment.

As described above, when a user accesses the digital library system of this embodiment, the user ID and password are checked so that fraudulent accesses by users not registered can be avoided. If a retrieval pseudo-session is connected between a client and a server, it becomes possible to refer to past retrieval history, to perform narrow-range retrieval for a past retrieval result set, and to calculate accounting information for each retrieval pseudo-session and notify the user of the accounting information. If both the function layer and the data layer are provided with the accounting information generation management object, it is possible for the function layer to notify the user of the accounting information including the accounting information at the data layer. Therefore, even if the library (function layer library) for providing retrieval services and the library (data layer library) for lending documents are different, accounting information can be supplied independently.

Figure 26:
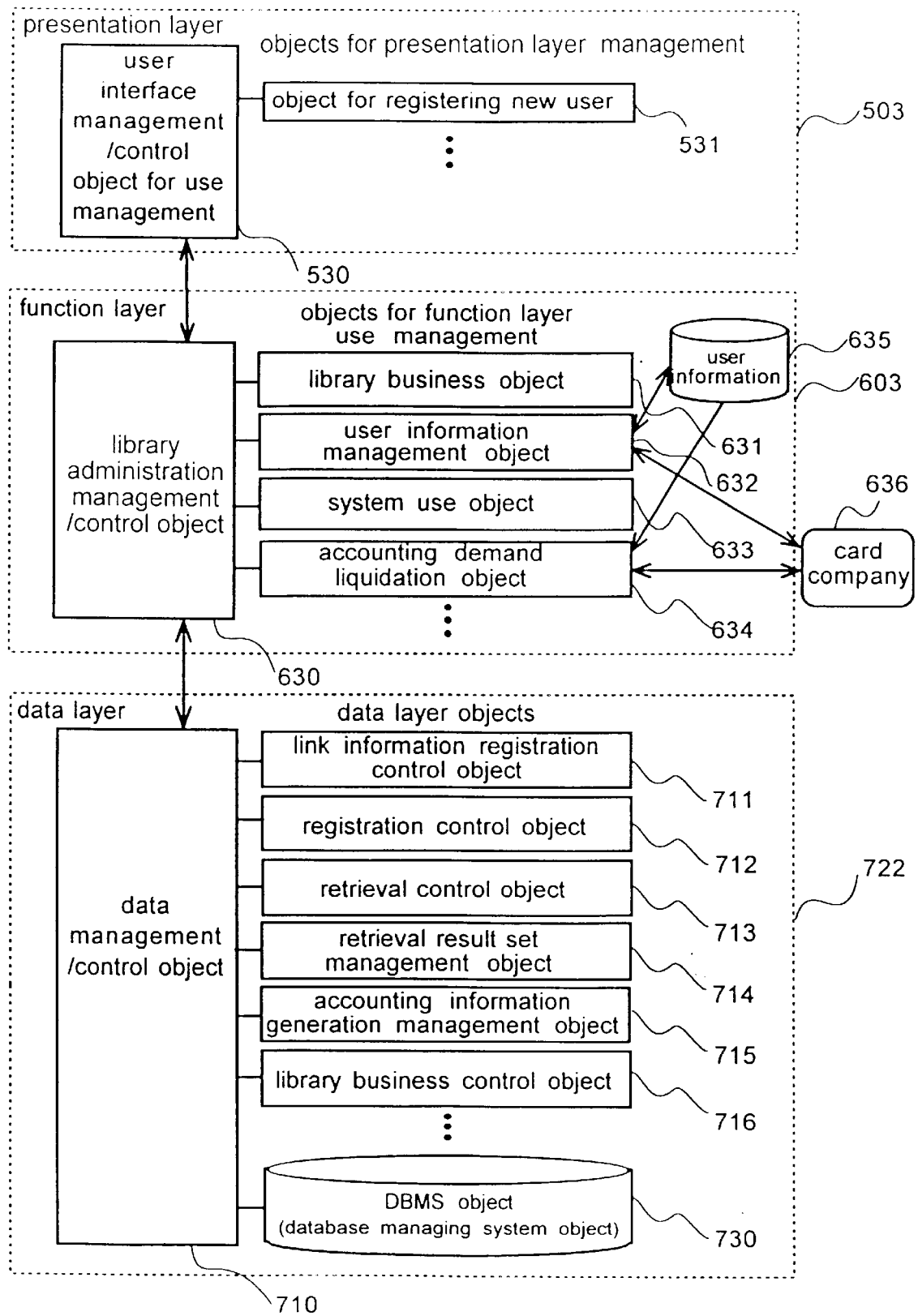
FIG. 26 is a diagram showing the configuration of a library administration object of the sixth embodiment of the invention.

Lastly, the contents of a user management process for registering a new user, among library businesses to be performed not by a library user but by a library staff (system manager of a digital library system), will be described with reference to FIG. 26.

In the document management system of this embodiment, presentation layer use management objects 503 include a new user registration object 531 and other objects, and a use management user interface management/control object 530 for managing and controlling these objects. Function layer use management objects 603 include a library business object 631 and other objects, and a library administration management/control object 630 for managing and controlling these objects. Data layer objects 722 include, in addition to the data layer objects 721 shown in FIG. 21, a library business control object 716.

Figure 27:
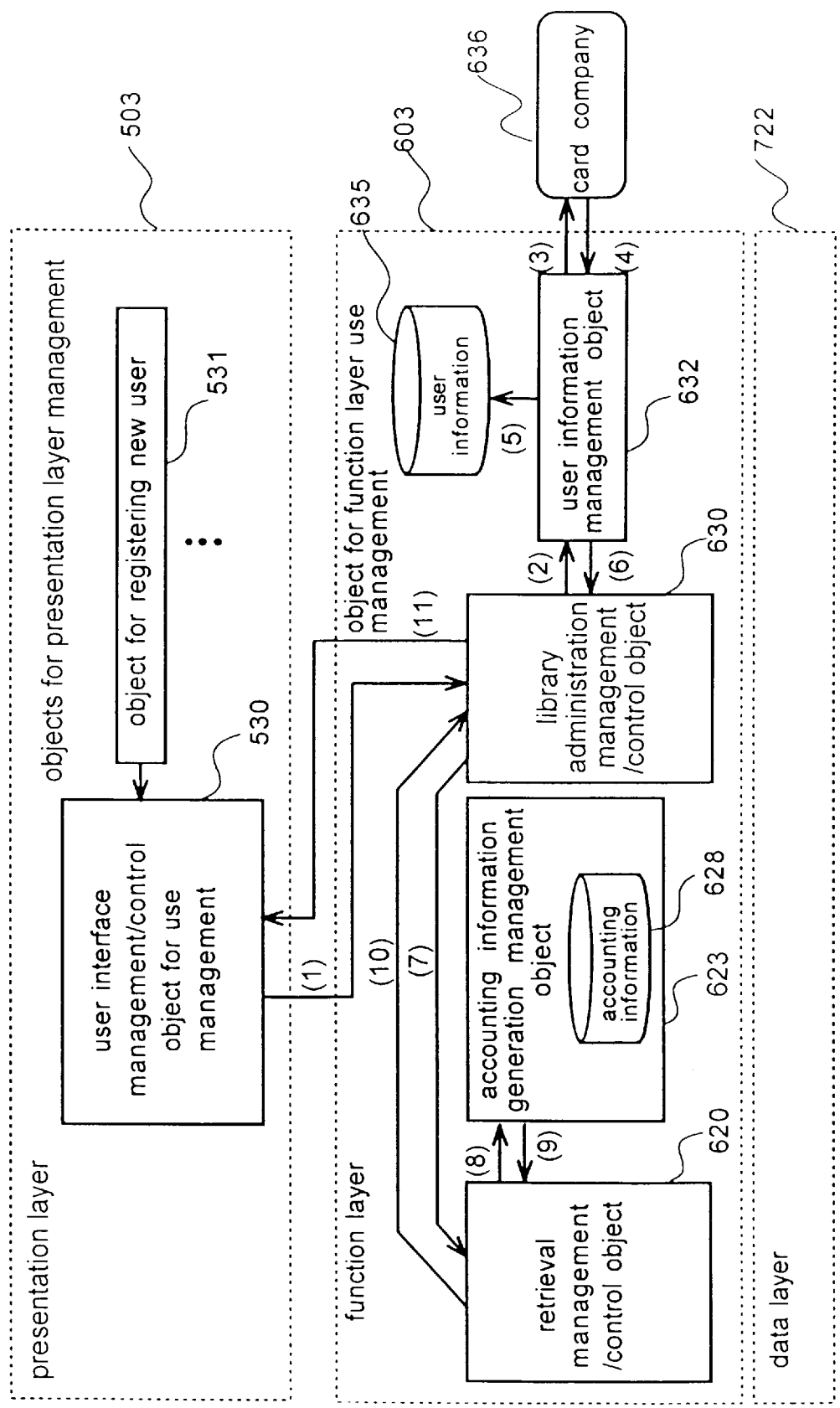
FIG. 27 is a diagram illustrating the procedure of a new user registration process of the sixth embodiment of the invention.

Next, the new user registration process of this embodiment will be described with reference to FIG. 27.

(1) The use management user interface management/control object 530 receives a registration request from a new user. Interface of new user registration is called from the log-in screen displayed during retrieval or inspection. This log-in screen (not shown) is constituted of a registration button and a text area for entering a name, an address, a card ID for accounting, and the like. As the user enters necessary items and clicks the registration button with a mouse, the use management user interface management/control object 530 transmits a new user registration instruction message to the library administration management/control object 630. The presentation layer performs simple input value check such as checking an input of all necessary items, and if there is a miss in entered items, the registration screen is again displayed to enter items.

(2) The library administration management/control object 630 received the new user registration instruction message analyzes the message, and if it is judged as a new user registration instruction message, transfers it to the user information management object 632.

(3) The user information management object 632 received the new user registration instruction message verifies the registration data entered by the user. If the registration data is correct, the card company 636 is requested to check the card ID. If there is any error in the registration data, a message is transmitted via the library administration management/control object 630 to the use management user interface management/control object 530 to display again the registration screen and make the user enter again.

(4) A check result of ID card authentication is received from the card company 636.

(5) If the card ID is correct, the user ID and password are set and the new user is registered in a user information table 635. If the card ID is not correct, the registration screen is again displayed to make the user enter it again. If the new user registration into the user information table 635 fails, the system manager is informed of abnormality.

(6) If the new user is normally registered into the user information table 635, the user information management object 632 sends a message so that a function layer accounting information table 628 registers the new user. First, a message is transmitted to the library administration management/control object 630.

(7) The library administration management/control object 630 transmits the received message to the retrieval management/control object 620.

(8) The retrieval management/control object 620 transmits the new user registration message received from the library administration management/control object 630 to the accounting information generation management object 624.

(9) The accounting information generation management object 624 received the new user registration message registers the new user in the accounting information table 628. After registration completion, the accounting information generation management object 624 transmits a registration completion message to the retrieval management/control object 620.

(10) The retrieval management/control object 620 transfers the received message to the library administration management/control object 630.

(11) The library administration management/control object 630 received the registration completion message transfers it together with the user ID and password to the use management user interface management/control object 530. The use management user interface management/control object 530 notifies the user of the registration completion, the registered user ID, and password, via the new user registration object 531.

The above is the contents of the new user registration process of the document management system of this embodiment.

In the above, registration of a library user has been described. Registration of a library staff user can be performed in the similar manner. Also in the above, registration by a library user has been described. Registration by a library staff user can be performed in the similar manner. Depending upon a system configuration (system configuration definition), the above user management may not be performed, but the system may be changed so that information of the digital library can be accessed by a user, without user verification operations (log-in operations).

In the above, routine processes such as registration, retrieval, and inspection processes of documents, and a registration process of new users are realized by using objects of the document management system of this embodiment.

Next, three functions implemented by using an agent will be described, the three functions being a library retrieval function using the cooperation mechanism through intermediation, an extended display function using a mobile agent, and a screen data generation function using a mobile agent. As stated earlier, an agent is more excellent in extendability and flexibility than an object, from the two viewpoints of the cooperation mechanism through intermediation and a mobile agent, and can easily implement new functions. The above three functions are implemented by utilizing these merits of the agent.

First, the library retrieval function using the cooperation mechanism through intermediation will be described.

The digital library system of this embodiment is not a centralized system for managing a large library database, but a distributed system interconnecting databases via a computer network. Each digital library system manages a database of its documents. In such a distributed digital library system, a user can access a library database of one digital library system from another library system connected to the former library system. It is important that which digital library is selected to retrieve a document a user wants to inspect. The user wants to minimize the time and money required for document retrieval. Therefore, retrieval is preferably executed at the digital library system which possesses the document the user wants. One method of realizing such a digital library system is to manage and use a list (hereinafter called a total list database) of documents of all libraries for document retrieval. With this method, the total list database becomes robust ant it takes a large cost for maintenance. Furthermore, there may occur the following problem. Depending upon a timing of updating the total list database for registration or deletion of a document, for example, if the timing of registering of a document into the total list database is delayed, document retrieval is not performed at the digital library system having this document.

In order to solve such a problem of a document presence site, the document retrieval function incorporates a concept of semantic routing of agents. The semantic routing realizes autonomous retrieval through judgement of an information presence site from the processing request contents, by using the cooperation mechanism through intermediation.

With the cooperation mechanism through intermediation, even if an agent does not know an information presence site, it can find another agent having desired information by inquiring the function layer agent management object. Registered in advance in the cooperation promoter are a site of an agent providing desired information (hereinafter called a retrieval execution agent) and information on the retrieval execution agent as to "information written in what language and expressed in what way the agent can find" (e.g., data containing a work "patent" in a data item accessible with SQL language can be found". As the cooperation promoter is inquired of "information written in what language and expressed in what way", the cooperation promoter searches the retrieval execution agent providing the desired information, from the registered information pieces. Therefore, the retrieval agent issuing a retrieval request for desired information is not necessary to know the information presence site.

Directory services are used in order to check whether desired information is present in an agent execution environment different from an agent execution environment with the retrieval agent. The directory services provide information possessed by an agent execution environment. Similar to the case where the function of the cooperation promoter searches the agent providing desired information, "information written in what language and expressed in what way is desired" is exchanged to judge whether an agent is in the agent execution environment to and at which the retrieval process is moved and executed.

Figure 28:
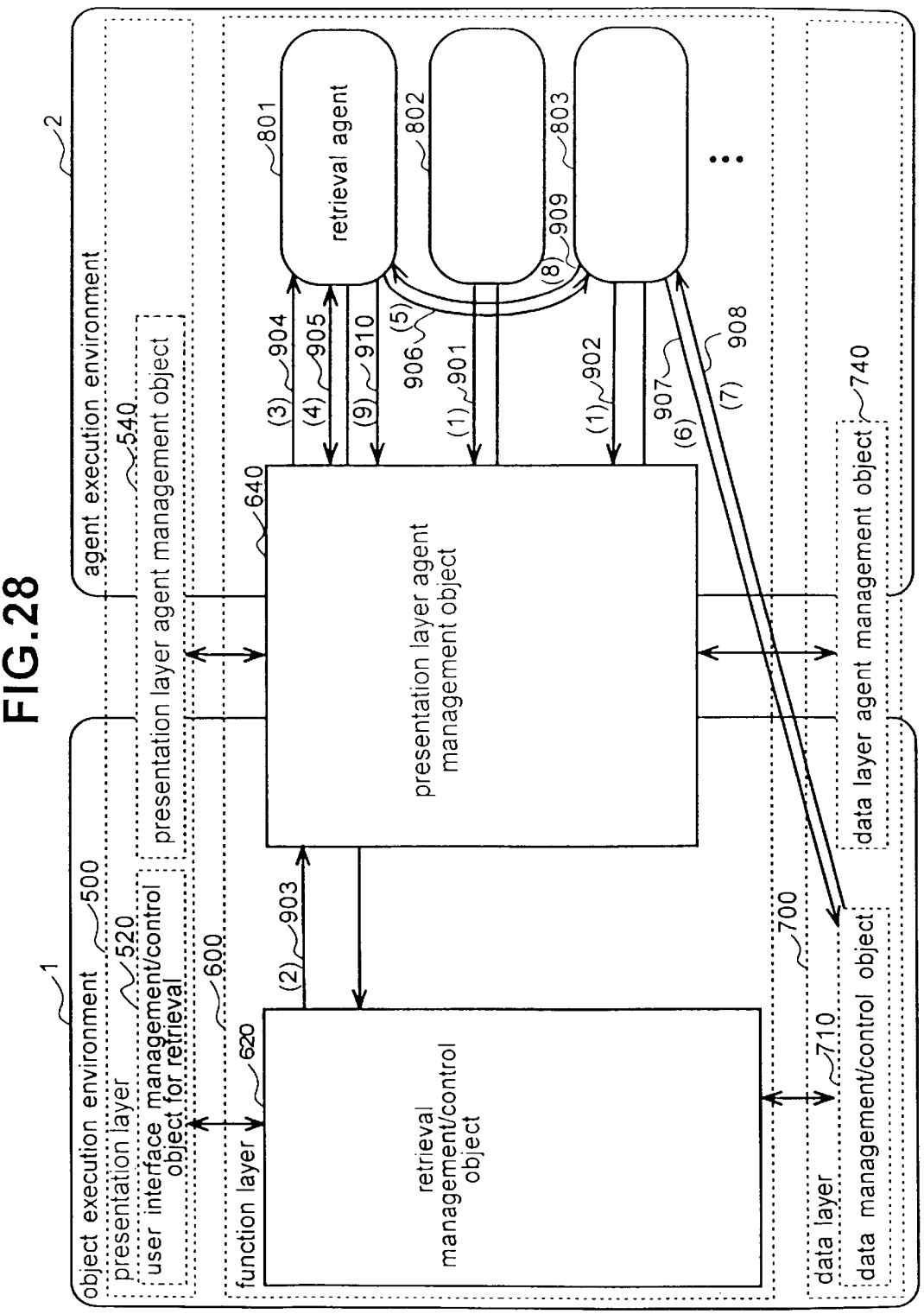
FIG. 28 is a diagram showing the configuration of an implemented retrieval agent of the sixth embodiment of the invention.

FIG. 28 is a diagram illustrating an example of the configuration implemented with a retrieval agent using the semantic routing. In FIG. 28, reference numeral 1 represents an object execution environment, reference numeral 2 represents an agent execution environment, reference numeral 500 represents a presentation layer, reference numeral 600 represents a function layer, reference numeral 700 represents a data layer, reference numeral 520 represents a retrieval user interface management/control object, reference numeral 540 represents a display agent management object, reference numeral 620 represents a retrieval management/control object, reference numeral 640 represents a function layer agent management object, reference numeral 710 represents a data layer management/control object, reference numeral 740 represents a data layer agent management object, reference numeral 801 represents a retrieval agent, and reference numerals 802 and 803 represent a retrieval execution agent.

The procedure of the library retrieval process using the semantic routine will be described with reference to FIG. 28. First, the retrieval execution agent A 802 and B 803 notify (901 and 902) the function layer agent management object 640 of supported functions. In the following, it is assumed that this notification has been completed already.

The retrieval management/control object 620 received a retrieval instruction from the presentation layer 500 transfers a retrieval processing request 903 to the function layer agent management object 640.

Upon reception of the retrieval processing request 903, the function layer agent management object 640 transfers a retrieval processing request 904 to a retrieval agent 801 suitable for the process.

The retrieval agent 801 inquires (905) the function layer agent management object 640 of desired information. Even if a site of desired information is not known, the cooperation promoter (not shown) in the function layer agent management object 640 notifies the retrieval agent 801 of the retrieval execution agent capable of retrieving the desired information. The retrieval agent 801 transmits a retrieval request 906 to the retrieval execution agent B 803 capable of providing the desired information, and passes the process to the retrieval execution agent B 803.

The retrieval execution agent B 803 retrieves the desired information by using its retrieval function (however, in practice, a retrieval process request 907 is issued to the data layer and a retrieval result 908 is received, and the retrieval execution agent B 803 itself does not perform database retrieval). After retrieval completion, the retrieval execution agent B 803 transfers a retrieval result 909 to the retrieval agent 801.

The retrieval agent 801 transfers a retrieval result 910 via the function layer agent management object 640 to the retrieval management/control object 620. The retrieval process is thus completed.

How the process of the retrieval agent 801 is passed to the retrieval execution agent 803 registered in advance in the cooperation promoter 910 is not limited only to a level of character string simple matching on the above-described SQL base. For example, the cooperation promoter may be implemented such that correspondence with an agent function notification level registered in advance (low level expression such as data operation language base) becomes possible. Therefore, for a request from an inquiry side agent, process statements can be written with library business language higher in level than the database operation language or agent operation language. Specifically, in order to allow correspondence between definition contents written at different levels in both the inquiry side agent and pre-registered agent, the customizing function of the cooperation promoter is used for implementing content analysis process, thesaurus process, and the like.

If desired information is not found during asynchronous retrieval as in this embodiment, the retrieval process may continue forever. In order to prevent this, it is necessary that the retrieval execution agent has a function of setting a retrieval termination condition. To this end, a user requesting information sets a retrieval condition such as "retrieval period of 3 days" and "retrieval fee of 10 thousands Yen or smaller". It is also necessary to provide default route setting and retrieval termination condition when a user does not supply a retrieval condition.

As above, in a distributed digital library system interconnected by a computer network, a user sometimes issues a document retrieval request without knowing a site of presence of desired information (documents). In this case, it is necessary to prepare a method of determining to which digital library system a document retrieval processing request is issued. By using the retrieval agent using the concept of the semantic routing, the retrieval execution agent capable of providing desired information can be identified by the function of the cooperation mechanism through intermediation, so that the document retrieval can be executed.

Next, the extended display function using a mobile agent will be described.

In the digital library system of this embodiment, as a browser for outputting information at a client machine, a browser for WWW (hereinafter called a WWW browser) is used. With the system configuration of clients using the WWW browser, it is possible to provide multimedia information via the Internet worldwide. The WWW browser has a general function of displaying multi-media information, and in addition a function of activating a dedicated viewer application (called a helper application).

A specific dedicated viewer presumably becomes necessary in the digital library system. For example, a client sometimes requires to melt compressed data (compression recovery), or a display function is provided for efficiently displaying a large amount of data (e.g., reduction display, display easy to look at a glance such as book images). In such as case, it is necessary to install a dedicated viewer at each client. However, in a digital library system, the number of users is large and indefinite and users are not necessarily familiar with computers. From these and other reasons, it is difficult to make each user install the dedicated viewer.

To solve this problem, an extended display function using the mobile agent function is used. A mobile agent is implemented with a viewer for extended display and moved to each client machine to provide extended display. In this manner, desired display can be provided without manual install of the viewer for extended display by each user.

Figure 29:
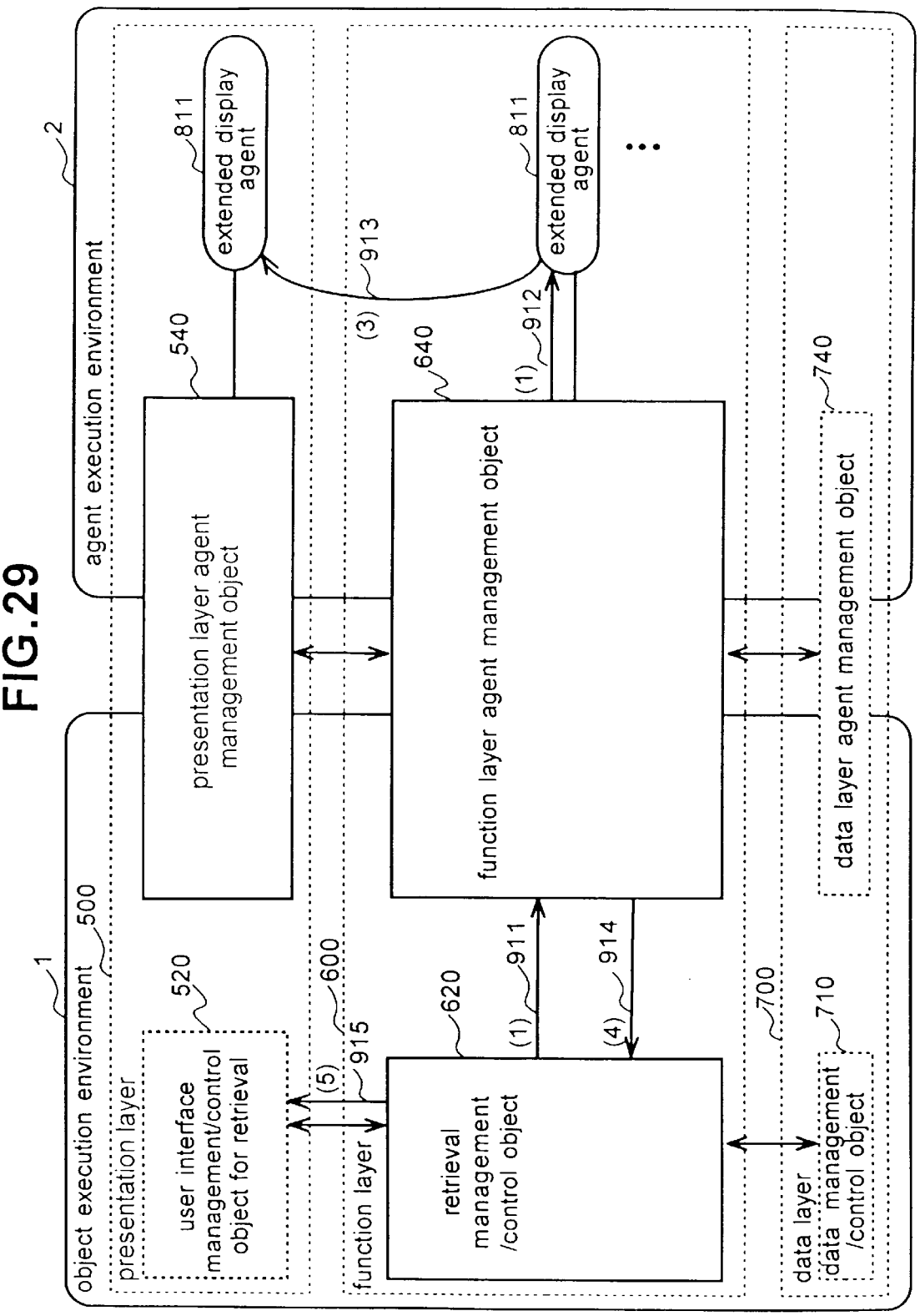
FIG. 29 is a diagram showing the configuration of an implemented extended display agent of the sixth embodiment of the invention.

FIG. 29 is a diagram showing the configuration with an extended display function using the mobile agent function. In FIG. 29, reference numeral 1 represents an object execution environment, reference numeral 2 represents an agent execution environment, reference numeral 500 represents a presentation layer, reference numeral 600 represents a function layer, reference numeral 700 represents a data layer, reference numeral 520 represents a retrieval user interface management/control object, reference numeral 540 represents a display agent management object, reference numeral 620 represents a retrieval management/control object, reference numeral 640 represents a function layer agent management object, reference numeral 710 represents a data layer management/control object, reference numeral 740 represents a data layer agent management object, and reference numeral 811 represents an extended display agent.

The procedure of the extended display process using the mobile agent function will be described with referent to FIG. 29.

When display data specific to the digital library system is required to be output, the retrieval management/control object 620 issues a processing request to be directed to the extended display agent 811, to the function layer agent management object 640.

The function layer agent management object 640 received the processing request 911 to be directed to the extended display agent 811 activates (912) the extended display agent 811.

The extended display agent 811 executes a moving method during its operation and moves (913) to the presentation layer (client machine) (the extended display agent 811 after movement is managed and controlled by the display agent management object 540).

The function layer agent management object 640 confirms the movement of the extended display agent 811, and supplies (914) the retrieval management/control object with a notification to this effect.

Upon reception of the notification 914, the retrieval management/control object transmits the display data to the retrieval user interface management/control object 520. The display data is passed via the retrieval user interface management/control object 520 to a WWW browser (not shown). The WWW browser activates the extended display agent 811 moved to the presentation layer as a helper application.

As above, in a digital library system, if a specific dedicated viewer is required, it is necessary for each client to install the viewer and it is difficult for all users to easily install it. However, a mobile agent is implemented with a viewer for extended display, and moved to each client machine for executing a display process. Therefore, information can be displayed in a desired form without manual install of the viewer for extended display by each user.

Lastly, the screen data generation function will be described. The screen data generation function is a function of generating data which is used for displaying at the presentation layer a screen of a digital library system (e.g., a document retrieval screen for entering a document retrieval condition, a document list screen for displaying a document retrieval result, and the like). The screen data is generated in accordance with the retrieval result or the like received from the data layer.

A process for screen display has been conventionally performed on a client machine. Recently, as in the relationship, for example, between a WWW server and a WWW browser, screen display is generally performed by installing the WWW browser having a general function on a client machine and by generating display data at the server side to send it to a client. With this method, the client having a general browser can access information so that it is not necessary for each client to install screen display software dedicated to each application. Therefore, it is very effective, particularly for a digital library system having a number of indefinite users. As stated earlier, the digital library system of this embodiment uses a WWW browser as software used by each client. Screen display is therefore performed with the WWW browser by sending screen data, generated at the function layer (server) by the screen data generation function, to the presentation layer (client).

A digital library system is required to cover a wide range of users at different ages and occupations, with different computer knowledge, skill, use purposes, and the like. It is also important to provide user interface for disabled persons. In the electronic library system, the configuration of user interface easy to use is a significant technical issue. Therefore, in developing user interface for a digital library system, user interface is not developed after establishing a screen specification at the development phase through conventional waterfall approaches, but it is necessary to design user interface at the development phase through spiral approaches in which an optimum screen specification is determined by repeating actual tests and evaluations of several screen specification drafts. In order to provide a development environment easy to repeat test and evaluation works, the agent is implemented with a screen data generation function. An example of implementing the screen data generation function on an agent will be described.

Figure 30:
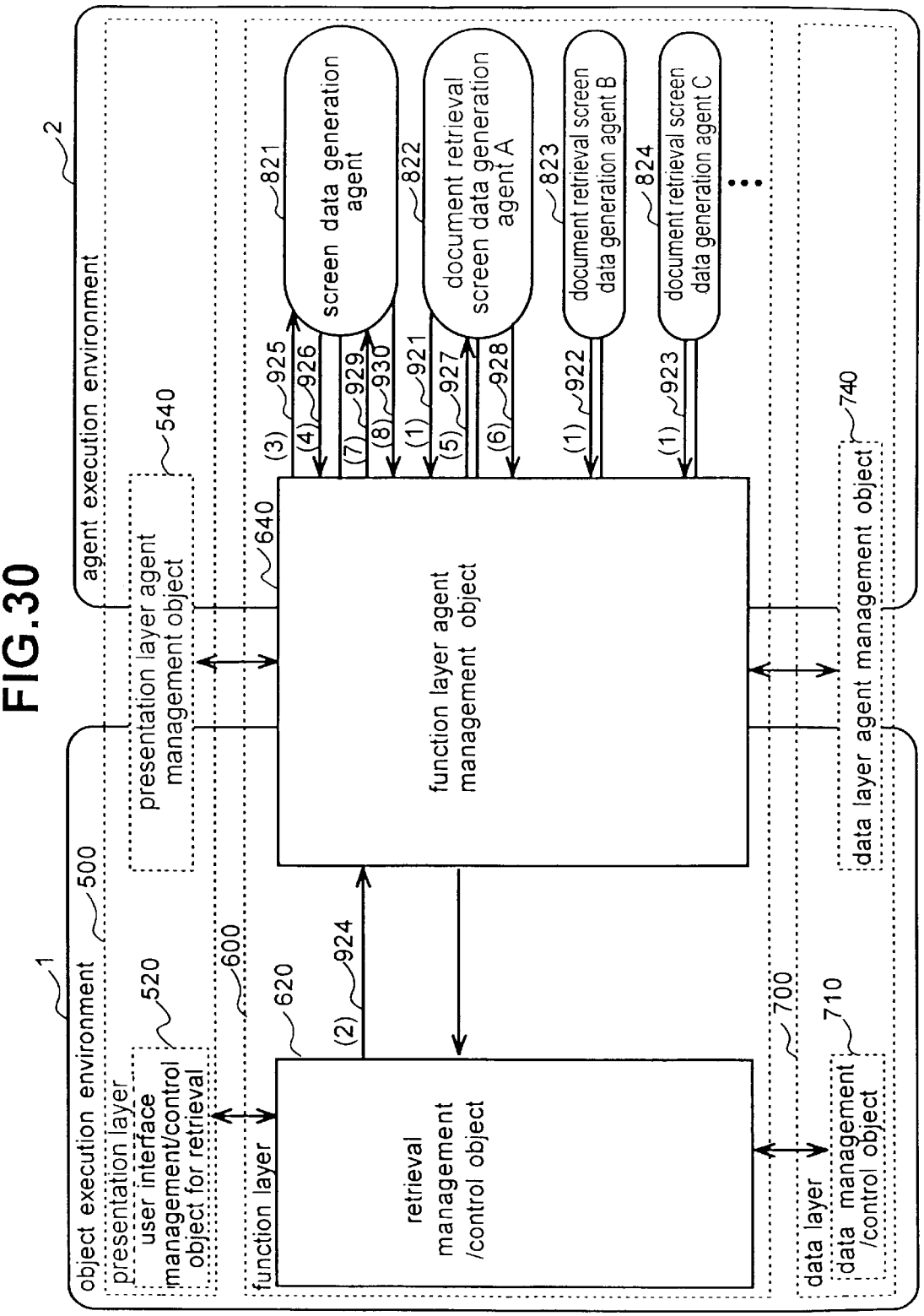
FIG. 30 is a diagram showing the configuration of a screen data generation function implemented by an agent according to the sixth embodiment of the invention.

FIG. 30 is a diagram showing the configuration with a screen data generation function implemented by an agent. In FIG. 30, reference numeral 1 represents an object execution environment, reference numeral 2 represents an agent execution environment, reference numeral 500 represents a presentation layer, reference numeral 600 represents a function layer, reference numeral 700 represents a data layer, reference numeral 520 represents a retrieval user interface management/control object, reference numeral 540 represents a display agent management object, reference numeral 620 represents a retrieval management/control object, reference numeral 640 represents a function layer agent management object, reference numeral 710 represents a data layer management/control object, reference numeral 740 represents a data layer agent management object, reference numeral 821 represents a screen data generation agent, and reference numerals 822 to 824 represent a document retrieval screen data generation agent.

In this configuration, agents (in FIG. 30, the document retrieval screen data generation agents 822 to 824) are prepared for generating screen data of each screen specification draft for each screen of the digital library system (although not shown, such as a document retrieval screen and a document list screen). Namely, a process of generating screen data of each screen for each screen specification draft is implemented by an agent. The process of generating screen data may use the screen data generation method in the configuration approach of graphic user interface (hereinafter abbreviated as GUI) described in "Variety of Interactions Realized between Digital Library and Users" by Ramanna Lao, Jan O Pedersen, Multi A Hurst, Jock D Mackenley, Stuart K Kard, Rally Machinter, Percrischan Herbersen, Jorge G Robertson, Nikkei Electronics, No. 643, 1995.

An agent for generating screen data of each screen in accordance with a screen specification draft is activated by the screen data generation agent 821 via the cooperation promoter contained in the function layer agent management object 640.

The procedure of the screen data generation process will be described with reference to FIG. 30. First, the document retrieval screen data generation agents 822 to 824 notify (921 to 923) the function layer agent management object 640 of functions supported by the agents. Assuming that this notification has been performed, the retrieval management/control object 620 transfers a retrieval screen generation request 924 (necessary data for generating screen display such as retrieval result data is contained in this request 924) to the function layer agent management object 640.

The function layer agent management object 640 received the retrieval screen generation request 924 transfers a retrieval screen generation request 925 to the screen data generation agent 821.

The screen data generation agent 821 analyzes the retrieval screen generation request, and transfers a processing request 926 to be directed to an agent which generates document retrieval screen data, to the function layer agent management object 640. The function layer agent management object 640 transfers a processing request 927 to one (in FIG. 30, agent 822) of the document retrieval screen data agents 822 to 824 capable of generating the requested retrieval screen data and already notified the function.

The document retrieval screen data generation agent 822 received the processing request generates document retrieval screen data and sends (928) it to the function layer agent management object 640.

The function layer agent management object 640 transfers (929) the screen data to the screen data generation agent 821 which is the processing requested agent, and the screen data generation agent 821 transfers (930) the screen data to the retrieval management/control object 620 via the function layer agent management object.

In accordance with the procedure described above, one of the processes for a screen specification draft is selected and executed for generating screen display data. Which screen specification draft is used for generating screen data is determined by the function of the cooperation mechanism through intermediation of an agent when the processing request is executed. Therefore, addition, modification, and deletion of a screen specification draft can be performed easily without changing the processing of other agents and objects. It is therefore possible to efficiently determine and evaluate screen specifications.

As above, by implementing the screen data generation function by using the agent, GUI of the digital library system can be efficiently configured. However, after the screen specification is established and the GUI configuration is completed, there is no merit of holding the screen data generation function by the agent. Furthermore, since basic and peripheral technologies are under development, if a function whose specification and fabrication methods are not still established is implemented by the agent in a large scale digital library system, the number of such agents becomes large. As the number of agents increases, indefinite factors of the system operation increase and the operation of the whole system becomes unpredictable, so that a problem that the merits of agents with high flexibility and extendability are lost, becomes conspicuous. In view of this, agents are changed into objects in accordance with the established screen specifications at the timing when the GUI configuration of the digital library system is completed.

Figure 31:
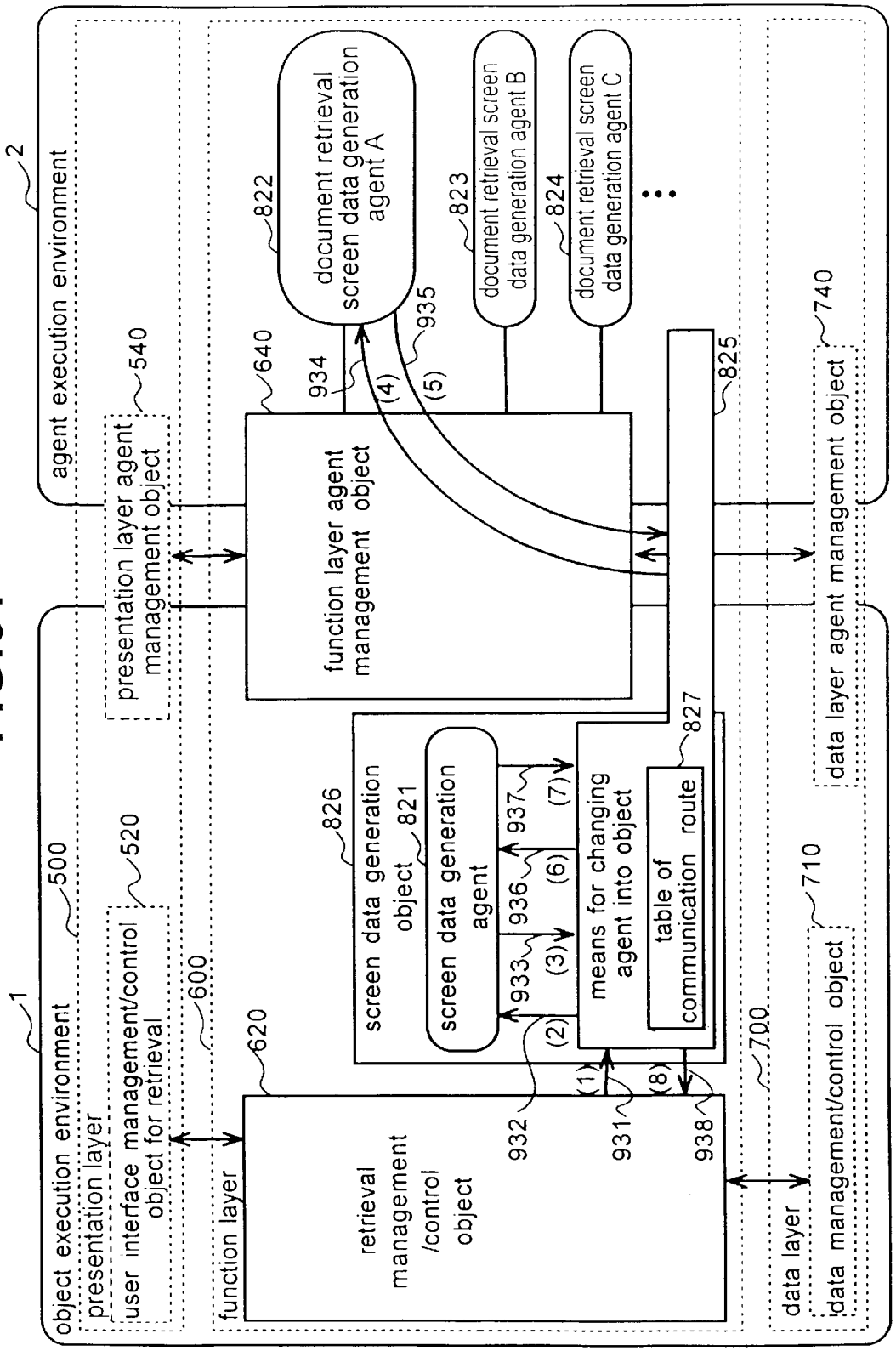
FIG. 31 is a diagram showing the configuration that a screen data generation agent was changed into an object according the sixth embodiment of the invention.
Figure 32:
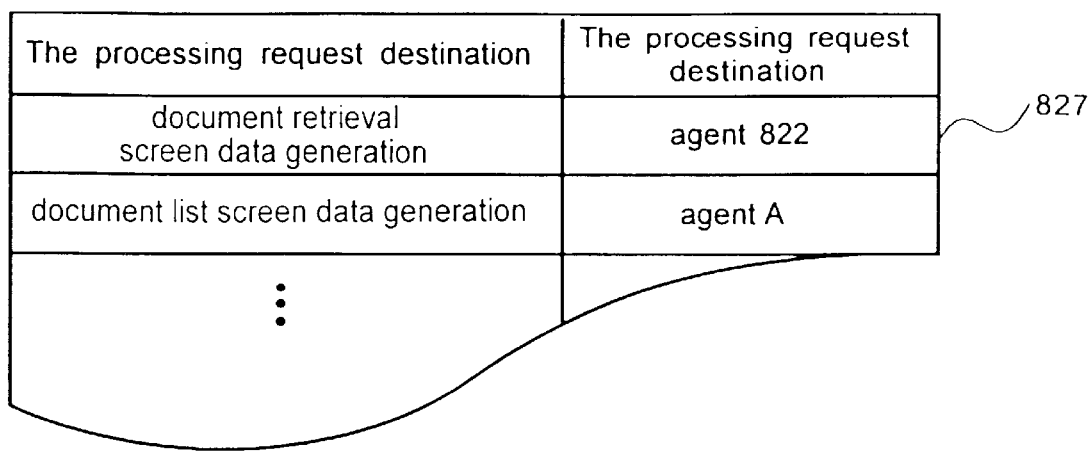
FIG. 32 is a diagram showing an example of a communication route table of the sixth embodiment of the invention.

FIG. 31 is a diagram showing the configuration that the screen data generation agent 821 shown in FIG. 30 was changed into an object. As compared to the configuration of FIG. 30, the image data generation agent 821 is added with means 825 for changing an agent into an object. The screen data generation agent 821 is changed into an object which is used as a screen data generation object 826 and contained in the object execution environment 1. A communication route table 827 contained in the means 825 for changing an agent into an object, stores correspondence between screen data generation requests and data generation agents in accordance with established screen specifications. An example of the communication route table 827 is shown in FIG. 32.

The procedure of the screen data generation process will be described with reference to FIG. 31. First, the retrieval management/control object 620 transmits a retrieval screen generation request 931 (necessary data for generating screen display such as retrieval result data is contained in this request 931) to the screen data generation object 826.

In the screen data generation object 826 received the retrieval screen generation request 931, the means 825 for changing an agent into an object activates (932) the screen data generation agent 821.

Similar to the case before being changed into an object, the screen data generation agent 821 transmits during its operation a processing request 933 to be directed to the agent which generates the document retrieval screen data, to the function layer agent management object 640. After the means 825 for changing an agent into an object receives the processing request 933, this request is not transmitted to the function layer agent management object 640, but the means 825 itself searches the communication route table 827 and determines the processing request destination. In this example, assuming that the processing request 933 is "document retrieval screen data generation", the processing request destination is determined from the communication route table 827 to be the "document retrieval screen data generation agent 822". Thereafter, the means 825 for changing an agent into an object transfers (934) the processing request 933 to the document retrieval screen data generation agent 822.

The document retrieval screen data generation agent 822 generates screen data and sends a processing result 935 to the means 825 for changing an agent into an object.

The means 825 for changing an agent into an object transfers a processing result 936 to the screen data generation agent 821.

The screen data generation agent 821 continues the process in accordance with the received processing result 936, and sends screen data 937 as the final processing result to the means 825 for changing an agent into an object. The means 825 for changing an object into an object supplies the final processing result as a processing result 938 to the retrieval management/control object 620.

As above, the means 825 for changing an agent into an object is added to the screen data generation agent 821 to change an agent into an object. Therefore, before the agent is changed into an object, the processing request is executed by selecting one of a plurality of agents (e.g., 822 to 824) by using the function of the cooperation mechanism when the processing request is executed, whereas after the agent is changed into an object, the processing request destination agent defined in the communication route table 827 is executed. Namely, in accordance with established screen specifications, processing the screen data generation function is fixed. As in this example, an agent to be changed into an object is an agent of the type that processing in an actual use does not considerably depend upon the function specific to the agent and that the function is not greatly degraded if it is changed into an object. In this manner, indefinite factors of agents can be eliminated, and system flexibility and extendability which may be degraded by using a number of agents can be recovered (the document retrieval function using the cooperation mechanism through intermediation and the extended display function using the mobile agent depend largely upon the function specific to the agent, and so the agent having such a function is not changed into an object). Since basic and peripheral technologies are under development, the scale of a developed digital library system becomes large. Therefore, if a function whose specification and fabrication methods are not still established is implemented by the agent in a large scale digital library system, the number of such agents becomes very large. Therefore, indefinite factors of the system operation increase and the operation of the whole system becomes unstable. In contrast, if an agent is changed into an object just before an actual use or at a timing when the number of agents increased, it becomes possible to develop a system with high flexibility and extendability while maintaining the system stability and maintainability.

According to the present invention, a system developer can develop using the merits of both the object- and agent-oriented paradigms, for example by implementing the function requiring stable operation by an object and the function with high change occurrence frequency by an agent.

If a number of agents are used in configuring a large system because of easy implementation, indefinite factors of the system operation increase. To avoid this, the invention provides means for changing an agent into an object. As system development proceeds, an agent necessary for stable operation and an agent with low change occurrence frequency are changed into objects to reduce indefinite factors of the system operation and recover the system flexibility and extendability which may be degraded by a number of agents.

An approach of changing an agent into an object has not been used conventionally. In changing an agent into an object, it is necessary to rewrite a portion using the function (cooperation mechanism through intermediation or mobile agent) specific to an agent. According to the present invention, without rewriting an agent to be changed into an object, means for changing an agent into an object is provided to change the agent into an object.

In a digital library system used as an example of the embodiment of the document management system of this invention, extendability and flexibility are required at a development phase, and stability and maintainability are required at an actual use phase.

The system configuration with high extendability and flexibility at the development phase can be realized in the following manner. In the system configuration of this invention integrating the agent and object execution environments, of functions of the digital library system, those functions to be determined through repetitive tests and evaluations are implemented by agents and those functions whose specifications and fabrication methods are still not established are implemented by objects.

However, in a large digital library system now under development, as the functions whose specifications and fabrication methods are still not established are implemented by agents, the number of agents becomes very large so that indefinite factors of the system operation increase and the merits of agents with high flexibility and extendability are lost. In this connection, the means for changing an agent into an object of this invention is used for an agent whose processing is not so much dependent upon the function specific to the agent or whose function is not degraded even if it is changed into an object. Therefore, it is possible to eliminate indefinite factors of agents and recover system flexibility and extendability to be degraded by a number of agents. It is therefore possible to realize a system configuration with better stability and maintainability at the actual use phase.

What is claimed is:

1. A document management system comprising:
    a first module implemented with an agent-oriented function;
    a second module implemented with an object-oriented function; and
    means for changing an agent into an object and executing said first module as said second module, including:
        communication route determination means provided with a communication route table which stores correspondence between processing request messages issued by agents and transmission communication routes, said communication determination means determining a transmission communication route for a processing request message issued by an agent, by searching the communication route table;
        object communication means for receiving a message from another object and transmitting the message to another object via a communication route determined by said communication route determination means;
        agent communication means for receiving a message from another agent and transmitting the message to another agent via a communication route determined by said communication determination means; and agent control means for receiving a processing request message to the agent via said object communication means or said agent communication means, activating the agent, and controlling the processing of the agent, and for determining a communication route by said communication route determination means and controlling the processing of issuing a message from the agent via said object communication means or said agent communication means.

2. A document management system according to claim 1, wherein said means for changing an agent into an object comprises:

internal information acquisition means for acquiring internal information of an agent moving to another environment and generating a message containing the internal information; and internal information setting means for, when the message generated by said internal information acquisition means is received from another object, setting the internal information of the agent contained in the message to the agent.

3. A document management system according to claim 2, wherein said means for changing an agent into an object comprises:

function notification means for notifying the function of the subject agent to the outside; and representative communication means for receiving a processing request from another agent as a representative of the subject agent, transferring the received processing request to the subject agent, and sending back a processing result of the subject agent to the requesting agent.

4. A document management system according to claim 3, wherein said second module has a three-layer structure comprising:

a presentation layer object for providing a user interface function when a document is retrieved and inspected;

a function layer object for providing a document retrieval and inspection function; and a data layer object including a database management object (DBMS object) for accumulating and managing document information and providing a management/control function of the DBMS object.

5. A document management system according to claim 2, wherein said second module has a three-layer structure comprising:

a presentation layer object for providing a user interface function when a document is retrieved and inspected;

a function layer object for providing a document retrieval and inspection function; and a data layer object including a database management object (DBMS object) for accumulating and managing document information and providing a management/control function of the DBMS object.

6. A document management system according to claim 1, wherein said means for changing an agent into an object comprises:

function notification means for notifying the function of the subject agent to the outside; and representative communication means for receiving a processing request from another agent as a representative of the subject agent, transferring the received processing request to the subject agent, and sending back a processing result o the subject agent to the requesting agent.

7. A document management system according to claim 6, wherein said second module has a three-layer structure comprising:

a presentation layer object for providing a user interface function when a document is retrieved and inspected;

a function layer object for providing a document retrieval and inspection function; and a data layer object including a database management object (DBMS object) for accumulating and managing document information and providing a management/control function of the DBMS object.

8. A document management system comprising:

a first module implemented with an agent-oriented function;

a second module implemented with an object-oriented function; and means for changing an agent into an object and executing said first module as said second module;

wherein said second module includes a management/control object for collectively managing and controlling objects in unit of function; and wherein said means for changing an agent into an object comprises:

communication route determination means provided with a communication route table which stores correspondence between processing request messages issued by agents and transmission communication routes, said communication determination means determining a transmission communication route for a processing request message issued by an agent, by searching the communication route table;

object communication means for receiving a message from another object and transmitting the message to another object via a communication route determined by said communication route determination means;

agent communication means for receiving a message from another agent and transmitting the message to another agent via a communication route determined by said communication determination means; and agent control means for receiving a processing request message to the agent via said object communication means or said agent communication means, activating the agent, and controlling the processing of the agent, and for determining a communication route by said communication route determination means and controlling the processing of issuing a message from the agent via said object communication means or said agent communication means.

9. A document management system according to claim 8, wherein said means for changing an agent into an object comprises:

internal information acquisition means for acquiring internal information of an agent moving to another environment and generating a message containing the internal information; and internal information setting means for, when the message generated by said internal information acquisition means is received from another object, setting the internal information of the agent contained in the message to the agent.

10. A document management system according to claim 9, wherein said means for changing an agent into an object comprises:

function notification means for notifying the function of the subject agent to the outside; and representative communication means for receiving a processing request from another agent as a representative of the subject agent, transferring the received processing request to the subject agent, and sending back a processing result of the subject agent to the requesting agent.

11. A document management system according to claim 10, wherein said second module has a three-layer structure comprising:

a presentation layer object for providing a user interface function when a document is retrieved and inspected;

a function layer object for providing a document retrieval and inspection function; and a data layer object including a database management object (DBMS object) for accumulating and managing document information and providing a management/control function of the DBMS object.

12. A document management system according to claim 9, wherein said second module has a three-layer structure comprising:

a presentation layer object for providing a user interface function when a document is retrieved and inspected;

a function layer object for providing a document retrieval and inspection function; and a data layer object including a database management object (DBMS object) for accumulating and managing document information and providing a management/control function of the DBMS object.

13. A document management system according to claim 8, wherein said means for changing an agent into an object comprises:

function notification means for notifying the function of the subject agent to the outside; and representative communication means for receiving a processing request from another agent as a representative of the subject agent, transferring the received processing request to the subject agent, and sending back a processing result of the subject agent to the requesting agent.

14. A document management system according to claim 13, wherein said second module has a three-layer structure comprising:

a presentation layer object for providing a user interface function when a document is retrieved and inspected;

a function layer object for providing a document retrieval and inspection function; and a data layer object including a database management object (DBMS object) for accumulating and managing document information and providing a management/control function of the DBMS object.

15. A document management system according to claim 1, wherein said second module has a three-layer structure comprising:

a presentation layer object for providing a user interface function when a document is retrieved and inspected;

a function layer object for providing a document retrieval and inspection function; and a data layer object including a database management object (DBMS object) for accumulating and managing document information and providing a management/control function of the DBMS object.

16. A document management system according to claim 8, wherein said second module has a three-layer structure comprising:

a presentation layer object for providing a user interface function when a document is retrieved and inspected;

a function layer object for providing a document retrieval and inspection function; and a data layer object including a database management object (DBMS object) for accumulating and managing document information and providing a management/control function of the DBMS object.

17. A document management system comprising:

a first module implemented with an agent-oriented function;

a second module implemented with an object-oriented function; and means for changing an agent into an object and executing said first module as said second module, including communication route determination means provided with a communication route table which stores correspondence between processing request messages issued by agents and transmission communication routes, said communication determination means determining a transmission communication route for a processing request message issued by an agent, by searching the communication route table.

18. A document management system according to claim 17, wherein said second module includes a management/control object for collectively managing and controlling objects in unit of function.

19. A document management system according to claim 18, wherein said means for changing an agent into an object comprises:

object communication means for receiving a message from another object and transmitting the message to another object via a communication route determined by said communication route determination means;

agent communication means for receiving a message from another agent and transmitting the message to another agent via a communication route determined by said communication determination means; and agent control means for receiving a processing request message to the agent via said object communication means or said agent communication means, activating the agent, and controlling the processing of the agent, and for determining a communication route by said communication route determination means and controlling the processing of issuing a message from the agent via said object communication means or said agent communication means.

20. A document management system according to claim 19, wherein said means for changing an agent into an object comprises:

internal information acquisition means for acquiring internal information of an agent moving to another environment and generating a message containing the internal information; and internal information setting means for, when the message generated by said internal information acquisition means is received from another object, setting the internal information of the agent contained in the message to the agent.

21. A document management system according to claim 20, wherein said means for changing an agent into an object comprises:

function notification means for notifying the function of the subject agent to the outside; and representative communication means for receiving a processing request from another agent as a representative of the subject agent, transferring the received processing request to the subject agent, and sending back a processing result of the subject agent to the requesting agent.

22. A document management system according to claim 21, wherein said second module has a three-layer structure comprising:

a presentation layer object for providing a user interface function when a document is retrieved and inspected;

a function layer object for providing a document retrieval and inspection function; and a data layer object including a database management object (DBMS object) for accumulating and managing document information and providing a management/control function of the DBMS object.

23. A document management system according to claim 20, wherein said second module has a three-layer structure comprising:

a presentation layer object for providing a user interface function when a document is retrieved and inspected;

a function layer object for providing a document retrieval and inspection function; and a data layer object including a database management object (DBMS object) for accumulating and managing document information and providing a management/control function of the DBMS object.

24. A document management system according to claim 19, wherein said means for changing an agent into an object comprises:

function notification means for notifying the function of the subject agent to the outside; and representative communication means for receiving a processing request from another agent as a representative of the subject agent, transferring the received processing request to the subject agent, and sending back a processing result of the subject agent to the requesting agent.

25. A document management system according to claim 24, wherein said second module has a three-layer structure comprising:

a presentation layer object for providing a user interface function when a document is retrieved and inspected;

a function layer object for providing a document retrieval and inspection function; and a data layer object including a database management object (DBMS object) for accumulating and managing document information and providing a management/control function of the DBMS object.

26. A document management system according to claim 19, wherein said second module has a three-layer structure comprising:

a presentation layer object for providing a user interface function when a document is retrieved and inspected;

a function layer object for providing a document retrieval and inspection function; and a data layer object including a database management object (DBMS object) for accumulating and managing document information and providing a management/control function of the DBMS object.

27. A document management system according to claim 18, wherein said means for changing an agent into an object comprises:

communication route determination means provided with a communication route table which stores correspondence between processing request messages issued by agents and transmission communication routes, said communication determination means determining a transmission communication route for a processing request message issued by an agent, by searching the communication route table;

object communication means for receiving a message from another object and transmitting the message to another object via a communication route determined by said communication route determination means;

agent communication means for receiving a message from another agent and transmitting the message to another agent via a communication route determined by said communication determination means; and agent control means for receiving a processing request message to the agent via said object communication means or said agent communication means, activating the agent, and controlling the processing of the agent, and fore determining a communication route by said communication route determination means and controlling the processing of issuing a message from the agent via said object communication means or said agent communication means.

28. A document management system according to claim 27, wherein said means for changing an agent into an object comprises:

internal information acquisition means for acquiring internal information of an agent moving to another environment and generating a message containing the internal information; and internal information setting means for, when the message generated by said internal information acquisition means is received from another object, setting the internal information of the agent contained in the message to the agent.

29. A document management system according to claim 28, wherein said means for changing an agent into an object comprises:

function notification means for notifying the function of the subject agent to the outside; and representative communication means for receiving a processing request from another agent as a representative of the subject agent, transferring the received processing request to the subject agent, and sending back a processing result of the subject agent to the requesting agent.

30. A document management system according to claim 29, wherein said second module has a three-layer structure comprising:

a presentation layer object for providing a user interface function when a document is retrieved and inspected;

a function layer object for providing a document retrieval and inspection function; and a data layer object including a database management object (DBMS object) for accumulating and managing document information and providing a management/control function of the DBMS object.

31. A document management system according to claim 28, wherein said second module has a three-layer structure comprising:

a presentation layer object for providing a user interface function when a document is retrieved and inspected;

a function layer object for providing a document retrieval and inspection function; and a data layer object including a database management object (DBMS object) for accumulating and managing document information and providing a management/ control function of the DBMS object.

32. A document management system according to claim 27, wherein said means for changing an agent into an object comprises:
   function notification means for notifying the function of the subject agent to the outside; and
   representative communication means for receiving a processing request from another agent as a representative of the subject agent, transferring the received processing request to the subject agent, and sending back a processing result of the subject agent to the requesting agent.

33. A document management system according to claim 32, wherein said second module has a three-layer structure comprising:
   a presentation layer object for providing a user interface function when a document is retrieved and inspected;
   a function layer object for providing a document retrieval and inspection function; and
   a data layer object including a database management object (DBMS object) for accumulating and managing document information and providing a management/ control function of the DBMS object.

34. A document management system according to claim 27, wherein said second module has a three-layer structure comprising:
   a presentation layer object for providing a user interface function when a document is retrieved and inspected;
   a function layer object for providing a document retrieval and inspection function; and
   a data layer object including a database management object (DBMS object) for accumulating and managing document information and providing a management/ control function of the DBMS object.

35. A document management system according to claim 18, wherein said second module has a three-layer structure comprising:
   a presentation layer object for providing a user interface function when a document is retrieved and inspected;
   a function layer object for providing a document retrieval and inspection function; and
   a data layer object including a database management object (DBMS object) for accumulating and managing document information and providing a management/ control function of the DBMS object.

36. A document management system according to claim 17, wherein said second module has a three-layer structure comprising:
   a presentation layer object for providing a user interface function when a document is retrieved and inspected;
   a function layer object for providing a document retrieval and inspection function; and
   a data layer object including a database management object (DBMS object) for accumulating and managing document information and providing a management/ control function of the DBMS object.

* * * * *